United States Patent
Shima

(10) Patent No.: US 12,425,652 B2
(45) Date of Patent: *Sep. 23, 2025

(54) IMAGE CODING APPARATUS, IMAGE CODING METHOD, AND STORAGE MEDIA

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,763

(22) Filed: Apr. 15, 2024

(65) Prior Publication Data
US 2024/0267562 A1 Aug. 8, 2024

Related U.S. Application Data

(63) Continuation of application No. 17/468,371, filed on Sep. 7, 2021, now Pat. No. 11,985,352, which is a (Continued)

(30) Foreign Application Priority Data

Mar. 11, 2019 (JP) ................... 2019-044276

(51) Int. Cl.
  *H04N 19/61* (2014.01)
  *H04N 19/126* (2014.01)
  (Continued)

(52) U.S. Cl.
CPC ........... *H04N 19/61* (2014.11); *H04N 19/126* (2014.11); *H04N 19/159* (2014.11); *H04N 19/176* (2014.11); *H04N 19/18* (2014.11)

(58) Field of Classification Search
CPC .. H04N 19/119; H04N 19/124; H04N 19/126; H04N 19/159; H04N 19/176; H04N 19/18; H04N 19/44; H04N 19/61
(Continued)

(56) References Cited

U.S. PATENT DOCUMENTS 11,962,806 B2 * 4/2024 Shima ................ H04N 19/126
11,985,352 B2 * 5/2024 Shima ................ H04N 19/44
(Continued)

FOREIGN PATENT DOCUMENTS

| CN | 1295310 A | 5/2001 |
| CN | 103238326 A | 8/2013 |

(Continued)

OTHER PUBLICATIONS

Chen et al., "Algorithm description for Versatile Video Coding and Test Model 4 (VTM 4)", Jan. 9-18, 2019, JVET-M1002-v1. (Year: 2019).*

(Continued)

*Primary Examiner* — Kathleen M Walsh
(74) *Attorney, Agent, or Firm* — Canon U.S.A., Inc. IP Division

(57) ABSTRACT

An orthogonal transform unit orthogonally transforms prediction residuals in a block of a P×Q array of pixels, thereby generating an N×M (N is an integer satisfying N<P, and M is an integer satisfying M<Q) array of orthogonal transform coefficients. A quantization unit quantizes the N×M array of the orthogonal transform coefficients using at least a quantization matrix of an N×M array of elements, and thereby generates an N×M array of quantized coefficients.

8 Claims, 16 Drawing Sheets

Related U.S. Application Data continuation of application No. PCT/JP2020/008439, filed on Feb. 28, 2020.

(51) Int. Cl.
  *H04N 19/159* (2014.01)
  *H04N 19/176* (2014.01)
  *H04N 19/18* (2014.01)

(58) Field of Classification Search
  USPC .................................................. 375/240.18
  See application file for complete search history.

(56) References Cited

U.S. PATENT DOCUMENTS

| | | | | |
|---|---|---|---|---|
| 2024/0214608 | A1* | 6/2024 | Shima | H04N 19/124 |
| 2024/0214609 | A1* | 6/2024 | Shima | H04N 19/136 |
| 2024/0223808 | A1* | 7/2024 | Shima | H04N 19/126 |
| 2024/0223809 | A1* | 7/2024 | Shima | H04N 19/61 |
| 2024/0259599 | A1* | 8/2024 | Shima | H04N 19/176 |
| 2024/0259600 | A1* | 8/2024 | Shima | H04N 19/18 |
| 2024/0259601 | A1* | 8/2024 | Shima | H04N 19/44 |
| 2024/0259602 | A1* | 8/2024 | Shima | H04N 19/176 |

FOREIGN PATENT DOCUMENTS

| | | |
|---|---|---|
| JP | 2023067181 A | 5/2023 |
| KR | 20130095289 A | 8/2013 |

OTHER PUBLICATIONS

Wei Fang, et al., Improved H.264 video encoding scheme, Computer Engineering and Design, vol. 26, No. 5, May 2005.

Qi Zhengjie, Optimization and Implementation of Transform in H.265/HEVC Video Coding, Thesis for Master's Degree in Electronics and Communications Engineering, Xidan University, Jun. 2017 (English abstract on 4th page).

Tung Nguyen, et al. Transform Coding Techniques in HEVC, IEEE Journal of Selected Topics in Signal Processing, vol. 7, No. 6, Dec. 2013.

* cited by examiner

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

| VALUE TO BE ENCODED | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG.11B

| VALUE TO BE ENCODED | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

FIG.12A

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

IMAGE CODING APPARATUS, IMAGE CODING METHOD, AND STORAGE MEDIA

CROSS-REFERENCE TO RELATED APPLICATIONS

This application is a Continuation of U.S. patent application Ser. No. 17/468,371, filed on Sep. 7, 2021, which is a Continuation of International Patent Application No. PCT/JP2020/008439, filed on Feb. 28, 2020, which claims the benefit of Japanese Patent Application No. 2019-044276, filed Mar. 11, 2019, both of which are hereby incorporated by reference herein in their entirety.

BACKGROUND OF THE INVENTION

Field of the Invention

The present invention relates to an image coding technique.

Background Art

A High Efficiency Video Coding (HEVC) coding method (hereinafter referred to as "HEVC") is known as a coding method for compressing a moving image. The HEVC employs a basic block of a larger size than a conventional macroblock (a 16×16 array of pixels) to improve coding efficiency. The basic block of the larger size is termed a coding tree unit (CTU), and the size of the CTU is a maximum of 64×64 pixels. The CTU is further divided into sub-blocks as units for performing prediction and transform.

The HEVC uses a quantization matrix to weight coefficients (hereinafter referred to as "orthogonal transform coefficients") after being orthogonally transformed according to frequency components. By using the quantization matrix, it is possible to increase compression efficiency while maintaining image quality, by reducing more data of high-frequency components, of which the deterioration is less likely to be noticeable to human vision, than data of low-frequency components. Japanese Patent Application Laid-Open No. 2013-38758 discusses a technique for encoding information indicating such a quantization matrix.

In recent years, the activity of internationally standardizing a higher efficiency coding method as a successor to HEVC is started. Specifically, the Joint Video Experts Team (JVET) established by the International Organization for Standardization/International Electrotechnical Commission (ISO/IEC) and the International Telecommunication Union-Telecommunication Standardization Sector (ITU-T) promotes the standardization of a Versatile Video Coding (VVC) coding method (hereinafter "VVC"). In this standardization, a new technique for reducing the encoding amount is being discussed, to improve efficiency, by forcibly setting orthogonal transform coefficients of high-frequency components to 0 (hereinafter referred to as "zeroing out") in a case where the block size for performing orthogonal transform is large.

CITATION LIST

Patent Literature

PTL 1: Japanese Patent Application Laid-Open No. 2013-038758

SUMMARY OF THE INVENTION

To more efficiently execute a technique for forcibly setting some orthogonal transform coefficients to 0, for example, the following configuration is applied. That is, an image coding apparatus that encodes an image in units of a plurality of blocks including a block of a P×Q array of pixels (P and Q are integers), thereby generating a bit stream includes orthogonal transform means for orthogonally transforming prediction residuals in the block of the P×Q array of pixels, thereby generating an N×M (N is an integer satisfying N<P, and M is an integer satisfying M<Q) array of orthogonal transform coefficients, and quantization means for quantizing the N×M array of the orthogonal transform coefficients using at least a quantization matrix of an N×M array of elements, and thereby generating an N×M array of quantized coefficients.

Further features of the present invention will become apparent from the following description of exemplary embodiments with reference to the attached drawings.

BRIEF DESCRIPTION OF THE DRAWINGS

FIG. 8A is a diagram illustrating an example of a quantization matrix used in the first exemplary embodiment and the second exemplary embodiment.

FIG. 8B is a diagram illustrating an example of a quantization matrix used in the first exemplary embodiment and the second exemplary embodiment.

FIG. 8C is a diagram illustrating an example of a quantization matrix used in the first exemplary embodiment and the second exemplary embodiment.

FIG. 11A is a diagram illustrating an example of an encoding table used to encode a difference value in a quantization matrix.

FIG. 11B is a diagram illustrating an example of an encoding table used to encode a difference value in a quantization matrix.

FIG. 12A is a diagram illustrating another example of a quantization matrix used in the first exemplary embodiment and the second exemplary embodiment.

FIG. 12B is a diagram illustrating another example of a quantization matrix used in the first exemplary embodiment and the second exemplary embodiment.

FIG. 12C is a diagram illustrating another example of a quantization matrix used in the first exemplary embodiment and the second exemplary embodiment.

DESCRIPTION OF THE EMBODIMENTS

Based on the attached drawings, exemplary embodiments of the present invention will be described. Configurations illustrated in the following exemplary embodiments are merely examples, and the present invention is not limited to the configurations described in the following exemplary embodiments. The names "basic block", "sub-block", "quantization matrix", and "base quantization matrix" are names used for convenience in the exemplary embodiments, and other names may be appropriately used to the extent that their meanings do not change. For example, a basic block and a sub-block may be referred to as a "basic unit" and a "sub-unit", or may be referred to simply as a "block" and a "unit". In the following description, a "rectangle" is a quadrangle of which the four interior angles are right angles and of which the two diagonals have equal lengths as generally defined. A "square" is, among rectangles, a quadrangle of which the four angles are all equal to each other and of which the four sides are all equal to each other as generally defined. That is, a "square" is a type of rectangle.

First Exemplary Embodiment

With reference to the drawings, an exemplary embodiment of the present invention is described below.

First, zeroing out is described in more detail. As described above, zeroing out is the process of forcibly setting some orthogonal transform coefficients in a block as an encoding target to 0. For example, suppose that a block of a 64×64 array of pixels in an input image (picture) is a block as an encoding target. At this time, the size of orthogonal transform coefficients is also 64×64. Zeroing out is the process of, for example, even if some of the 64×64 array of the orthogonal transform coefficients have values other than 0 as a result of the orthogonal transform, encoding the orthogonal transform coefficients by regarding the orthogonal transform coefficients as 0. For example, low-frequency components corresponding to a predetermined range at the upper left including direct current (DC) components in two-dimensional orthogonal transform coefficients are not forcibly set to 0, and orthogonal transform coefficients corresponding to higher frequency components than the low-frequency components are always set to 0.

Figure 1:
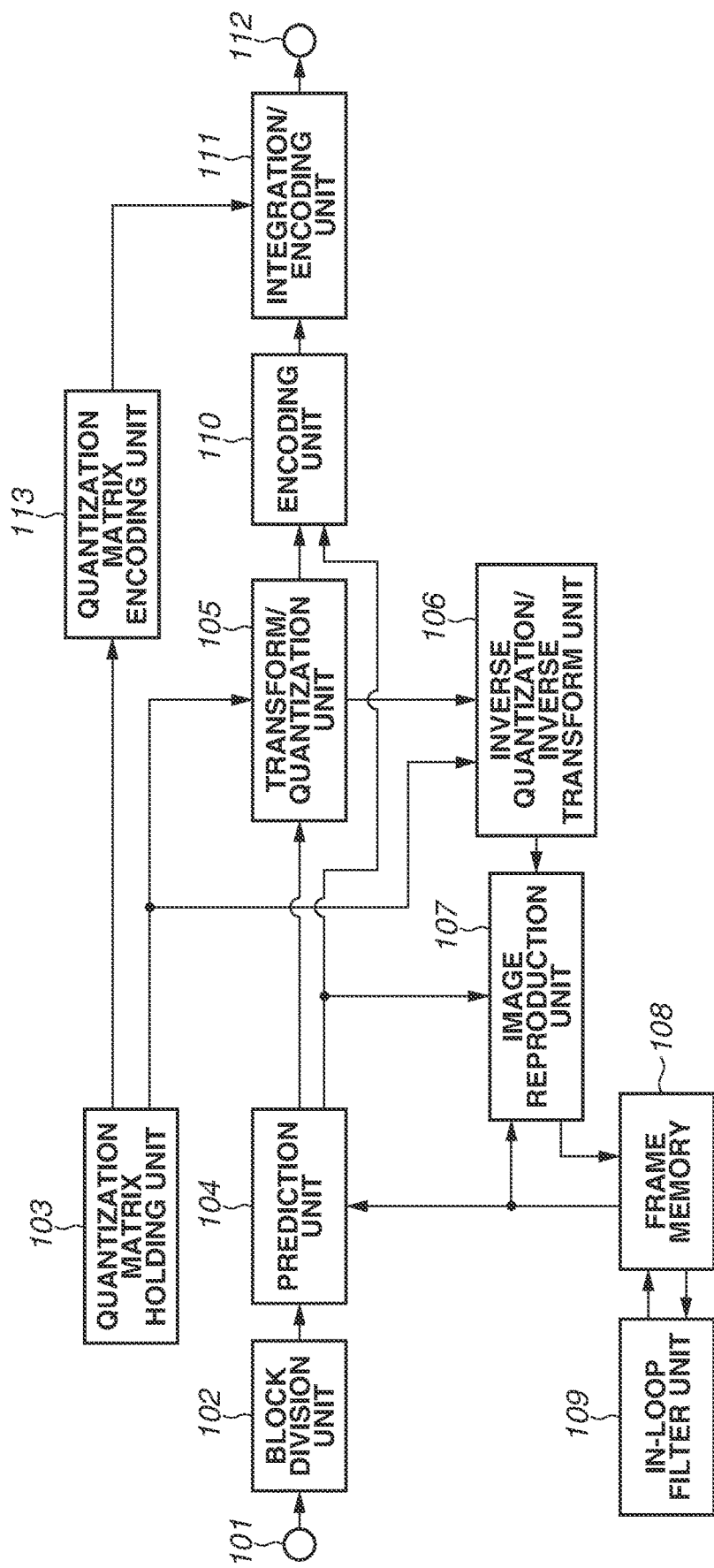
FIG. 1 is a block diagram illustrating a configuration of an image coding apparatus according to a first exemplary embodiment.

An image coding apparatus according to the present exemplary embodiment will now be described. FIG. 1 is a block diagram illustrating the image coding apparatus according to the present exemplary embodiment. In FIG. 1, image data is input to a terminal 101.

A block division unit 102 divides the input image into a plurality of basic blocks and outputs the images in units of basic blocks to the subsequent stage.

A quantization matrix holding unit 103 generates and stores quantization matrices. The quantization matrices are used to weight a quantization process on orthogonal transform coefficients according to frequency components. A quantization step for orthogonal transform coefficients in a quantization process described below is weighted by, as an example, multiplying a scale value (a quantization scale) based on a parameter value (a quantization parameter) as a reference by the values of the elements of the quantization matrices.

Figure 8B:
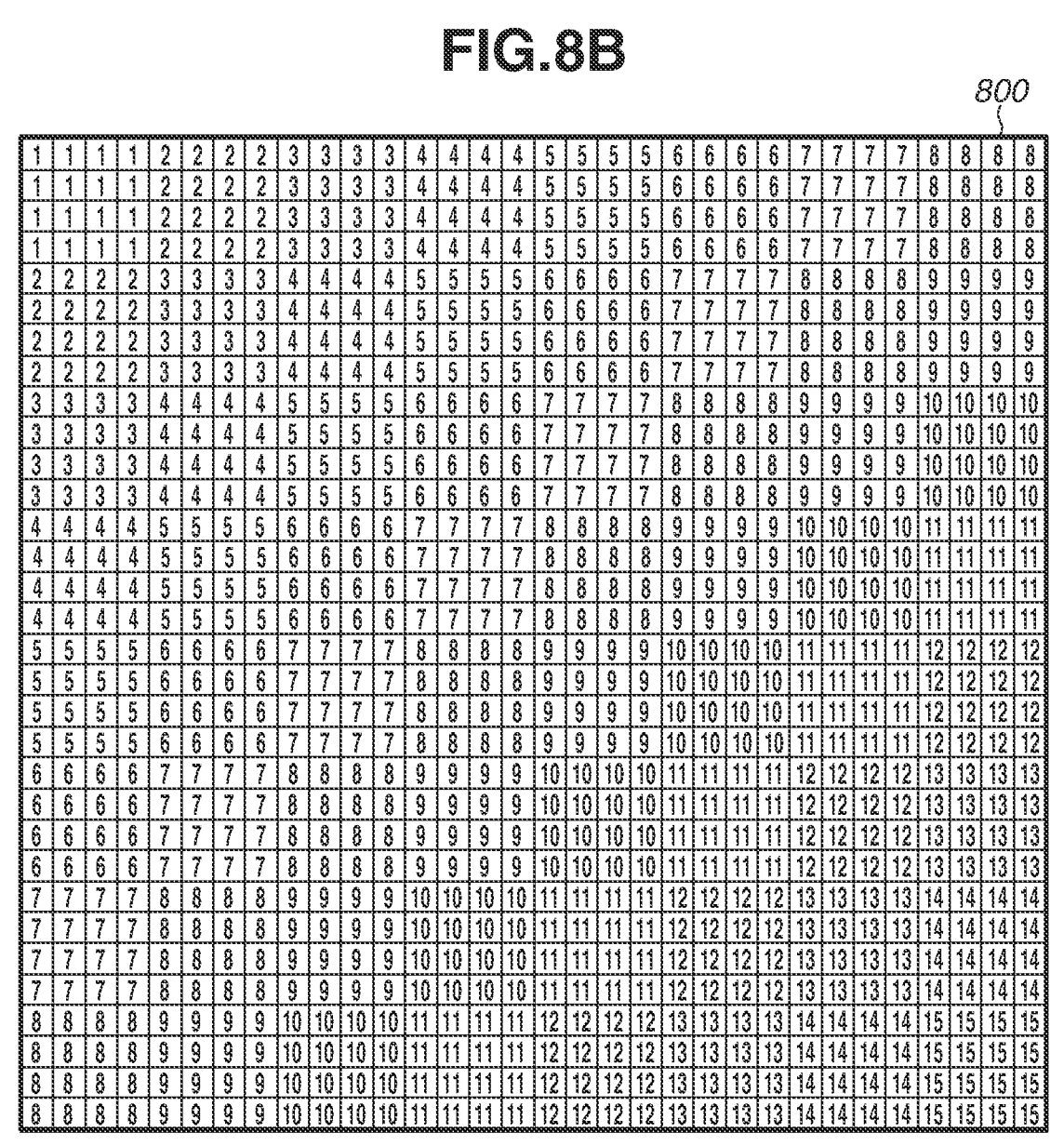
Figure 8C:
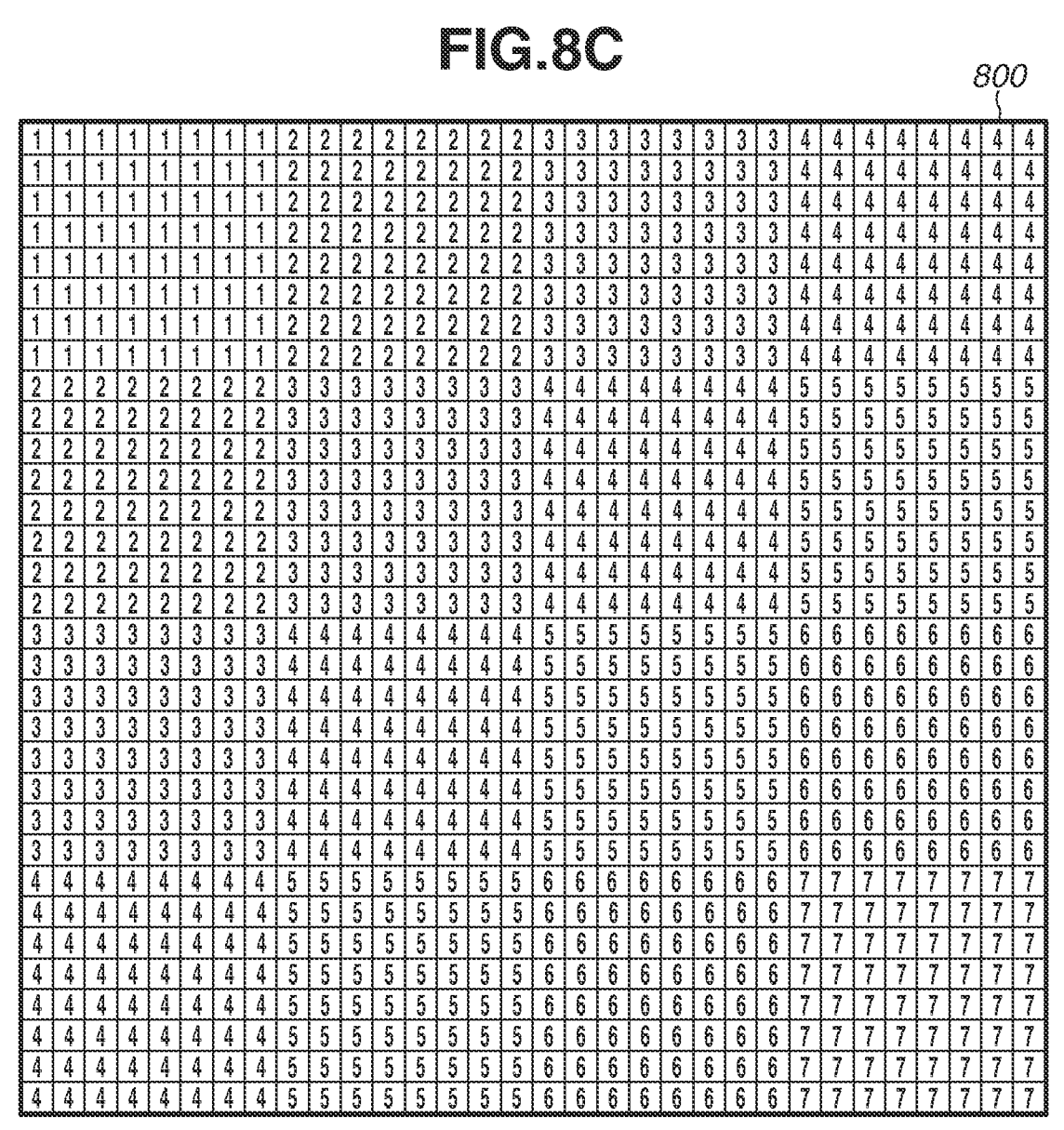

A generation method for generating the quantization matrices to be stored in the quantization matrix holding unit 103 is not particularly limited. For example, a user may input information indicating the quantization matrices, or the image coding apparatus may calculate the quantization matrices based on the characteristics of the input image. Alternatively, the quantization matrices specified in advance as initial values may be used. In the present exemplary embodiment, two types of two-dimensional quantization matrices of a 32×32 array generated by enlarging the base quantization matrix and illustrated in FIGS. 8B and 8C are generated and stored in addition to a base quantization matrix of an 8×8 array illustrated in FIG. 8A. The quantization matrix in FIG. 8B is a quantization matrix of a 32×32 array obtained by enlarging the base quantization matrix of the 8×8 array illustrated in FIG. 8A four times by repeating the elements of the base quantization matrix of the 8×8 array four times in the vertical and horizontal directions. In contrast, the quantization matrix in FIG. 8C is a quantization matrix of a 32×32 array obtained by enlarging the base quantization matrix illustrated in FIG. 8A by repeating each of the elements of an upper left 4×4 portion of the base quantization matrix eight times in the vertical and horizontal directions.

As described above, the base quantization matrix is a quantization matrix used not only to quantize a sub-block of an 8×8 array of pixels, but also to create a quantization matrix of a larger size than the size of the base quantization matrix. The size of the base quantization matrix is 8×8, but is not limited to this size. Alternatively, another base quantization matrix may be used according to the size of sub-blocks. In a case where three types of sub-blocks, for example, sub-blocks of 8×8, 16×16, and 32×32 arrays, are used, three types of base quantization matrices corresponding to the respective sub-blocks can also be used.

A prediction unit 104 determines sub-block division for the image data in units of basic blocks. That is, the prediction unit 104 determines whether the basic blocks are to be divided into sub-blocks, and if the basic blocks are to be divided, determines how the basic blocks are to be divided. If the basic blocks are not to be divided into sub-blocks, the sub-blocks are of the same size as the basic blocks. Each sub-block may be a square, or may be a rectangle (a non-square) other than a square.

The prediction unit 104 then performs intra prediction, which is intra-frame prediction, and inter prediction, which is inter-frame prediction, in units of sub-blocks, thereby generating predicted image data.

For example, the prediction unit 104 selects a prediction method to be performed on a single sub-block from the intra prediction or the inter prediction and performs the selected prediction, thereby generating predicted image data for the sub-block. The prediction method to be used, however, is not limited to these, and prediction obtained by combining the intra prediction and the inter prediction may be used.

The prediction unit 104 calculates prediction residuals from the input image data and the predicted image data and outputs the prediction residuals. For example, the prediction unit 104 calculates the differences between the pixel values of the sub-block and the pixel values of the predicted image data generated by predicting the sub-block, thereby calculating the differences as prediction residuals.

The prediction unit 104 also outputs information required for the prediction, such as information indicating the division state of the sub-block, and information, such as a prediction mode indicating the prediction method for predicting the sub-block and a motion vector, together with the prediction residuals. Hereinafter, the information required for the prediction will be referred to collectively as "prediction information".

A transform/quantization unit 105 orthogonally transforms the prediction residuals calculated by the prediction unit 104 in units of sub-blocks, thereby obtaining orthogonal transform coefficients representing the frequency components of the prediction residuals. The transform/quantization unit 105 further quantizes the orthogonal transform coefficients using the quantization matrices stored in the quantization matrix holding unit 103 and the quantization parameter, thereby obtaining quantized coefficients that are the quantized orthogonal transform coefficients. The function of performing the orthogonal transform and the function of performing the quantization may be separately configured.

An inverse quantization/inverse transform unit 106 inversely quantizes the quantized coefficients output from the transform/quantization unit 105, using the quantization matrices stored in the quantization matrix holding unit 103 and the quantization parameter, thereby reproducing the orthogonal transform coefficients. The inverse quantization/inverse transform unit 106 further inversely orthogonally transforms the orthogonal transform coefficients and reproduces the prediction residuals. The process of thus reproducing (deriving) the orthogonal transform coefficients using the quantization matrices and the quantization parameter is referred to as "inverse quantization". The function of performing the inverse quantization and the function of performing the inverse quantization may be separately configured. Information for an image decoding apparatus to derive the quantization parameter is also encoded into a bit stream by an encoding unit 110.

A frame memory 108 stores reconstructed image data.

Based on the prediction information output from the prediction unit 104, an image reconstruction unit 107 appropriately references the frame memory 108, thereby generating the predicted image data. The image reconstruction unit 107 then generates reconstruction image data based on the predicted image data and the input prediction residuals and outputs the reconstruction image data.

An in-loop filter unit 109 performs an in-loop filter process, such as deblocking filtering and sample adaptive offset, on the reconstruction image and outputs the image subjected to the filter process.

The encoding unit 110 encodes the quantized coefficients output from the transform/quantization unit 105 and the prediction information output from the prediction unit 104, thereby generating code data. The encoding unit 110 then outputs the code data.

A quantization matrix encoding unit 113 encodes the base quantization matrix output from the quantization matrix holding unit 103, thereby generating quantization matrix code data for the image decoding apparatus to derive the base quantization matrix. The quantization matrix encoding unit 113 then outputs the quantization matrix code data.

An integration/encoding unit 111 generates header code data using the quantization matrix code data output from the quantization matrix encoding unit 113. The integration/encoding unit 111 further combines the header code data with the code data output from the encoding unit 110, thereby forming a bit stream. The integration/encoding unit 111 then outputs the bit stream.

A terminal 112 outputs the bit stream generated by the integration/encoding unit 111 to outside.

An image encoding operation performed by the image coding apparatus will be described below. In the present exemplary embodiment, a configuration is employed in which moving image data is input in units of frames. In the present exemplary embodiment, for illustrative purposes, a description is given on the assumption that the block division unit 102 divides the moving image data into basic blocks of a 64×64 array of pixels. The present invention, however, is not limited to this. For example, blocks of a 128×128 array of pixels may be used as basic blocks, or blocks of a 32×32 array of pixels may be used as basic blocks.

Before the encoding of an image, the image coding apparatus generates and encodes quantization matrices. In the following description, as an example, the horizontal direction corresponds to an x-coordinate, and the vertical direction corresponds to a y-coordinate, in a quantization matrix 800 and each block. The right direction of the horizontal direction is positive, and the down direction of the vertical direction is positive. The coordinates of the element at the upper left end of the quantization matrix 800 are defined as (0, 0). That is, the coordinates of the element at the lower right end of a base quantization matrix of an 8×8 array are (7, 7). The coordinates of the element at the lower right end of a quantization matrix of a 32×32 array are (31, 31).

First, the quantization matrix holding unit 103 generates quantization matrices. The quantization matrices are generated according to the size of sub-blocks, the size of orthogonal transform coefficients to be quantized, and the type of the prediction method. In the present exemplary embodiment, a base quantization matrix of an 8×8 array illustrated in FIG. 8A and used to generate quantization matrices described below is first generated. Next, two types of quantization matrices of a 32×32 array illustrated in FIGS. 8B and 8C are generated by enlarging the base quantization matrix. The quantization matrix in FIG. 8B is a quantization matrix of a 32×32 array obtained by enlarging the base quantization matrix of the 8×8 array illustrated in FIG. 8A four times by repeating the elements of the base quantization matrix of the 8×8 array four times in the vertical and horizontal directions.

That is, in the example illustrated in FIG. 8B, the value of the element at the upper left end of the base quantization matrix, namely 1, is assigned to the elements of the quantization matrix of the 32×32 array in the range where the x-coordinates are 0 to 3 and the y-coordinates are 0 to 3. The value of the element at the lower right end of the base quantization matrix, namely 15, is assigned to the elements of the quantization matrix of the 32×32 array in the range where the x-coordinates are 28 to 31 and the y-coordinates are 28 to 31. In the example of FIG. 8B, all the values of the elements of the base quantization matrix are assigned to any of the elements of the quantization matrix of the 32×32 array.

In contrast, the quantization matrix in FIG. 8C is a quantization matrix of a 32×32 array obtained by enlarging the base quantization matrix illustrated in FIG. 8A by repeating the elements of an upper left 4×4 array portion of the base quantization matrix eight times in the vertical and horizontal directions.

That is, in the example illustrated in FIG. 8C, the value of the element at the upper left end of the upper left 4×4 array portion of the base quantization matrix, namely 1, is assigned to the elements of the quantization matrix of the 32×32 array in the range where the x-coordinates are 0 to 7 and the y-coordinates are 0 to 7. The value of the element at the lower right end of the upper left 4×4 array portion of the base quantization matrix, namely 7, is assigned to the elements of the quantization matrix of the 32×32 array in the range where the x-coordinates are 24 to 31 and the y-coordinates are 24 to 31. In the example of FIG. 8C, only the values of the elements corresponding to the upper left 4×4 array portion (in the range where the x-coordinates are 0 to 3 and the y-coordinates are 0 to 3) among the values of the elements of the base quantization matrix are assigned to the elements of the quantization matrix of the 32×32 array.

The quantization matrices to be generated, however, are not limited to these. In a case where there is also a size other than 32×32 as the size of orthogonal transform coefficients to be quantized, quantization matrices corresponding to the size of the orthogonal transform coefficients to be quantized, such as 16×16, 8×8, or 4×4, may be generated. A determination method for determining the elements included in the base quantization matrix or the quantization matrices is not particularly limited. For example, predetermined initial values may be used, or the elements may be individually set. Alternatively, the quantization matrices may be generated according to the characteristics of the image.

The quantization matrix holding unit 103 holds the thus generated base quantization matrix and quantization matrices. FIG. 8B is an example of a quantization matrix used to quantize orthogonal transform coefficients corresponding to a sub-block of a 32×32 array described below. FIG. 8C is an example of a quantization matrix used to quantize orthogonal transform coefficients corresponding to a sub-block of a 64×64 array described below. A thick frame 800 represents a quantization matrix. For ease of description, each quantization matrix includes 1024 pixels in a 32×32 array, and squares within the thick frame represent the elements included in the quantization matrix. In the present exemplary embodiment, the three types of quantization matrices illustrated in FIGS. 8B and 8C are held in two-dimensional shapes. However, the elements of the quantization matrices are not limited to this. Alternatively, a plurality of quantization matrices can also be held for the same prediction method, depending on the size of the orthogonal transform coefficients to be quantized or depending on whether the encoding target is a luminance block or a color difference block. In general, a quantization matrix achieves a quantization process according to the human visual feature. Thus, as illustrated in FIGS. 8B and 8C, the elements of a low-frequency portion corresponding to an upper left portion of the quantization matrix are small, and the elements of a high-frequency portion corresponding to a lower right portion of the quantization matrix are large.

The quantization matrix encoding unit 113 reads the elements of the base quantization matrix stored in a two-dimensional shape in order from the quantization matrix holding unit 103 and scans the elements, thereby calculating the differences between the elements. The quantization matrix encoding unit 113 then places the differences in a one-dimensional matrix. In the present exemplary embodiment, in the base quantization matrix illustrated in FIG. 8A, the difference between each element and the previous element in scanning order is calculated using a scanning method illustrated in FIG. 9. For example, the base quantization matrix of the 8×8 array illustrated in FIG. 8A is scanned using the scanning method illustrated in FIG. 9. After the first element "1" located at the upper left is scanned, an element "2" located immediately below the first element "1" is scanned, and the difference between these elements is calculated as +1. To encode the first element ("1" in the present exemplary embodiment) of the quantization matrix, the difference between the first element and a predetermined initial value (e.g., 8) is calculated. However, the method is not limited to this. Alternatively, the difference between the first element and any value, or the value itself of the first element may be used.

Figure 9:
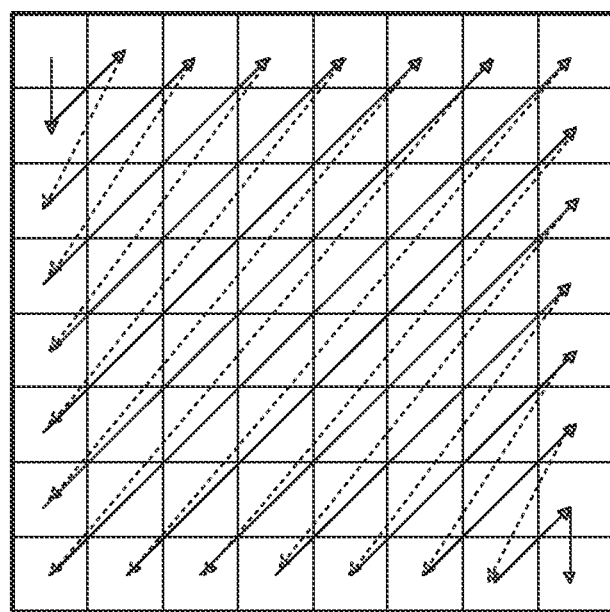
FIG. 9 is a diagram illustrating a scanning method for scanning elements of a quantization matrix used in the first exemplary embodiment and the second exemplary embodiment.
Figure 10:
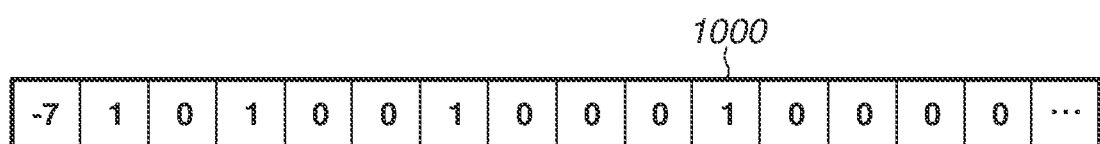
FIG. 10 is a diagram illustrating a difference value matrix of a quantization matrix generated in the first exemplary embodiment and the second exemplary embodiment.

In this manner, in the present exemplary embodiment, a difference matrix illustrated in FIG. 10 is generated from the base quantization matrix illustrated in FIG. 8A using the scanning method illustrated in FIG. 9. The quantization matrix encoding unit 113 further encodes the difference matrix, thereby generating quantization matrix code data. In the present exemplary embodiment, the difference matrix is encoded using an encoding table illustrated in FIG. 11A. The encoding table, however, is not limited to this. Alternatively, for example, an encoding table illustrated in FIG. 11B may be used. The thus generated quantization matrix code data is output to the integration/encoding unit 111 at the subsequent stage.

Referring back to FIG. 1, the integration/encoding unit 111 encodes header information required to encode image data and integrates the header information with the quantization matrix code data.

Image data is subsequently encoded. Image data of a single frame input from the terminal 101 is input to the block division unit 102.

The block division unit 102 divides the input image data into a plurality of basic blocks and outputs the images in units of basic blocks to the prediction unit 104. In the present exemplary embodiment, the block division unit 102 outputs the images in units of basic blocks of a 64×64 array of pixels.

The prediction unit 104 executes a prediction process on the image data in units of basic blocks input from the block division unit 102. Specifically, the prediction unit 104 determines sub-block division for further dividing the basic blocks into smaller sub-blocks and further determines a prediction mode such as intra prediction or inter prediction in units of sub-blocks.

Figure 7A:
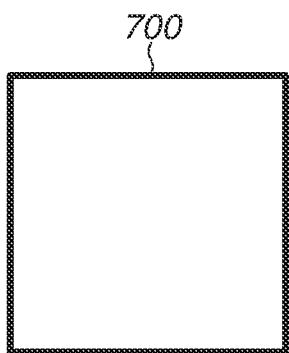
FIG. 7A is a diagram illustrating an example of sub-block division used in the first exemplary embodiment and the second exemplary embodiment.
Figure 7B:
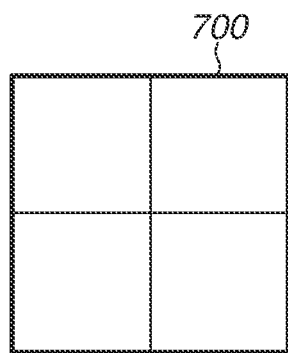
FIG. 7B is a diagram illustrating an example of sub-block division used in the first exemplary embodiment and the second exemplary embodiment.
Figure 7C:
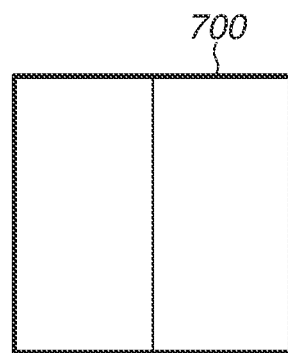
FIG. 7C is a diagram illustrating an example of sub-block division used in the first exemplary embodiment and the second exemplary embodiment.
Figure 7D:
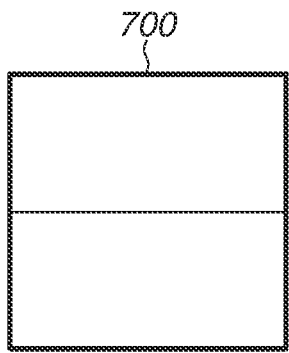
FIG. 7D is a diagram illustrating an example of sub-block division used in the first exemplary embodiment and the second exemplary embodiment.

FIGS. 7A to 7F illustrate an example of a sub-block division method. A thick frame 700 represents a basic block. For ease of description, the basic block includes a 64×64 array of pixels, and quadrangles within the thick frame represent sub-blocks. FIG. 7B illustrates an example of square sub-block division based on a quadtree, and the basic block of the 64×64 array of pixels is divided into sub-blocks of a 32×32 array of pixels. In contrast, FIGS. 7C to 7F illustrate examples of rectangular sub-block division. In FIG. 7C, the basic block is divided into vertically long rectangular sub-blocks of a 32×64 array of pixels. In FIG.

Figure 7E:
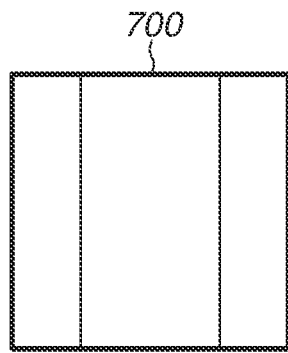
FIG. 7E is a diagram illustrating an example of sub-block division used in the first exemplary embodiment and the second exemplary embodiment.
Figure 7F:
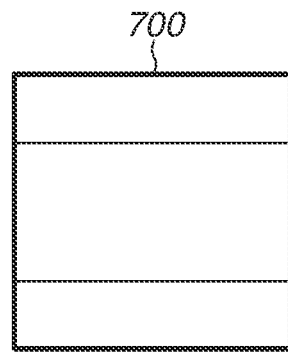
FIG. 7F is a diagram illustrating an example of sub-block division used in the first exemplary embodiment and the second exemplary embodiment.

7D, the basic block is divided into horizontally long rectangular sub-blocks of a 64×32 array of pixels. In FIGS. 7E and 7F, the basic block is divided into rectangular sub-blocks at a ratio of 1:2:1. As described above, the encoding process is performed using not only square sub-blocks, but also rectangular sub-blocks other than square sub-blocks. Alternatively, the basic block may be further divided into a plurality of square blocks, and sub-block division may be performed using the divided square blocks as a reference. In other words, the size of the basic block is not limited to the 64×64 array of pixels. Furthermore, basic blocks of a plurality of sizes may be used.

In the present exemplary embodiment, only the basic block of the 64×64 array of pixels that is not divided as illustrated in FIG. 7A and the quadtree division as illustrated in FIG. 7B are used. The sub-block division method, however, is not limited to this. Alternatively, the ternary tree division in FIG. 7E or 7F or the binary tree division in FIG. 7C or 7D may be used. In a case where sub-block division other than that illustrated in FIGS. 7A and 7B is also used, a quantization matrix corresponding to sub-blocks used by the quantization matrix holding unit 103 is generated. In a case where a new base quantization matrix corresponding to the generated quantization matrix is also generated, the new base quantization matrix is also encoded by the quantization matrix encoding unit 113.

A prediction method by the prediction unit 104 used in the present exemplary embodiment will be described in further detail. In the present exemplary embodiment, two types of prediction methods, namely intra prediction and inter prediction, are used as an example. In the intra prediction, prediction pixels in an encoding target block are generated using encoded pixels located spatially around the encoding target block, and information regarding an intra prediction mode indicating an intra prediction method used among intra prediction methods, such as horizontal prediction, vertical prediction, and DC prediction, is also generated. In the inter prediction, prediction pixels in an encoding target block are generated using encoded pixels in a frame temporally different from that of the encoding target block, and motion information indicating, for example, a frame to be referenced and a motion vector is also generated. As described above, the prediction unit 104 may use a prediction method obtained by combining the intra prediction and the inter prediction.

Predicted image data is generated based on the determined prediction mode and the encoded pixels, and prediction residuals are further generated from the input image data and the predicted image data and output to the transform/quantization unit 105. Information regarding the sub-block division and the prediction mode is output as prediction information to the encoding unit 110 and the image reconstruction unit 107.

The transform/quantization unit 105 orthogonally transforms and quantizes the input prediction residuals, thereby generating quantized coefficients. First, an orthogonal transform process corresponding to the size of the sub-blocks is performed on the prediction residuals, and thereby orthogonal transform coefficients are generated. Next, the orthogonal transform coefficients are quantized using the quantization matrices stored in the quantization matrix holding unit 103 according to the prediction mode, and thereby quantized coefficients are generated. The orthogonal transform/quantization process will be described more specifically below.

If the sub-block division of 32×32 arrays illustrated in FIG. 7B is selected, a 32×32 array of prediction residuals is orthogonally transformed using an orthogonal transform matrix of a 32×32 array, and thereby a 32×32 array of orthogonal transform coefficients is generated. Specifically, an orthogonal transform matrix of a 32×32 array and a 32×32 array of prediction residuals are multiplied by each other as typified by discrete cosine transform (DCT), and thereby a 32×32 matrix shape of intermediate coefficients is calculated. The multiplication of the 32×32 matrix shape of the intermediate coefficients and the transpose of the above orthogonal transform matrix of the 32×32 array is further performed, and thereby a 32×32 array of orthogonal transform coefficients is generated. The thus generated 32×32 array of the orthogonal transform coefficients are quantized using the quantization matrix of the 32×32 array illustrated in FIG. 8B and the quantization parameter, and thereby a 32×32 array of quantized coefficients is generated. Since four sub-blocks of a 32×32 array exist in the basic block of the 64×64 array, the above process is repeated four times.

In a case where the division state of the 64×64 array illustrated in FIG. 7A (without division) is selected, in contrast, an orthogonal transform matrix of a 64×32 array generated by thinning out odd-numbered rows (hereinafter referred to as "odd number rows") of an orthogonal transform matrix of a 64×64 array is used for a 64×64 array of prediction residuals. That is, the 64×64 array of prediction residuals is orthogonally transformed using the orthogonal transform matrix of the 64×32 array generated by thinning out the odd number rows, and thereby a 32×32 array of orthogonal transform coefficients is generated.

Specifically, an orthogonal transform matrix of a 64×32 array is first generated by thinning out odd number rows from an orthogonal transform matrix of a 64×64 array. The orthogonal transform matrix of the 64×32 array and the 64×64 array of the prediction residuals are then multiplied by each other, and thereby a 64×32 matrix shape of intermediate coefficients is generated. The multiplication of the 64×32 matrix shape of the intermediate coefficients and a transpose of a 32×64 array obtained by transposing the above orthogonal transform matrix of the 64×32 array is performed, and thereby a 32×32 array of orthogonal transform coefficients is generated. The transform/quantization unit 105 then sets the generated 32×32 array of the orthogonal transform coefficients to coefficients in an upper left portion of a 64×64 array of orthogonal transform coefficients (in the range where the x-coordinates are 0 to 31 and the y-coordinates are 0 to 31) and sets coefficients in other portions to 0, thereby executing zeroing out.

As described above, a 64×64 array of prediction residuals is orthogonally transformed using an orthogonal transform matrix of a 64×32 array and a transpose of a 32×64 array obtained by transposing the orthogonal transform matrix of the 64×32 array, in the present exemplary embodiment. A 32×32 array of orthogonal transform coefficients is thus generated, and thereby zeroing out is executed. Consequently, it is possible to generate a 32×32 array of orthogonal transform coefficients with a smaller amount of calculation than that used in a technique of forcibly setting the values of some part of a 64×64 array of orthogonal transform coefficients generated by performing orthogonal transform using a 64×64 matrix to 0 even if the values are not 0. That is, it is possible to reduce the amount of calculation of orthogonal transform as compared with a case where orthogonal transform is performed using an orthogonal transform matrix of a 64×64 array, and as a result, orthogonal transform coefficients as a target of zeroing out are regarded as 0 and encoded regardless of whether the orthogonal transform coefficients are 0. If the method for calculating a 32×32 array of orthogonal transform coefficients from a 64×64 array of prediction residuals using orthogonal transform coefficients is used, it is possible to reduce the amount of calculation. The method for zeroing out, however, is not limited to this method, and various methods can also be used.

In a case where zeroing out is executed, information indicating that orthogonal transform coefficients in the range of a target of the zeroing out are 0 may be encoded. Alternatively, information (a flag) indicating that the zeroing out has been performed may be simply encoded. The image decoding apparatus decodes these pieces of information and thereby can decode blocks by regarding the target of the zeroing out as 0.

The transform/quantization unit 105 quantizes the thus generated 32×32 array of the orthogonal transform coefficients using the quantization matrix of the 32×32 array illustrated in FIG. 8C and the quantization parameter, thereby generating a 32×32 array of quantized coefficients.

In the present exemplary embodiment, the quantization matrix in FIG. 8B is used for a 32×32 array of orthogonal transform coefficients corresponding to a sub-block of a 32×32 array. The quantization matrix in FIG. 8C is used for a 32×32 array of orthogonal transform coefficients corresponding to a sub-block of a 64×64 array. That is, the quantization matrix in FIG. 8B is used for a 32×32 array of orthogonal transform coefficients that is not subjected to zeroing out. The quantization matrix in FIG. 8C is used for a 32×32 array of orthogonal transform coefficients subjected to zeroing out and corresponding to a sub-block of a 64×64 array. The quantization matrix to be used, however, is not limited to this. The generated quantized coefficients are output to the encoding unit 110 and the inverse quantization/inverse transform unit 106.

The inverse quantization/inverse transform unit 106 inversely quantizes the input quantized coefficients using the quantization matrices stored in the quantization matrix holding unit 103 and the quantization parameter, thereby reproducing the orthogonal transform coefficients. The inverse quantization/inverse transform unit 106 further inversely orthogonally transforms the reproduced orthogonal transform coefficients, thereby reproducing the prediction residuals. In the inverse quantization process, a quantization matrix corresponding to the size of the sub-blocks as an encoding target is used, similarly to the transform/quantization unit 105. The inverse quantization/inverse orthogonal transform process by the inverse quantization/inverse transform unit 106 will be described more specifically below.

If the sub-block division of the 32×32 array in FIG. 7B is selected, the inverse quantization/inverse transform unit 106 inversely quantizes the 32×32 array of the quantized coefficients generated by the transform/quantization unit 105, using the quantization matrix illustrated in FIG. 8B, thereby reproducing the 32×32 array of the orthogonal transform coefficients. The inverse quantization/inverse transform unit 106 then performs the multiplication of the above transpose of the 32×32 array and the orthogonal transform matrix of the 32×32 array, thereby calculating a 32×32 matrix shape of intermediate coefficients. Then, the inverse quantization/inverse transform unit 106 performs the multiplication of the 32×32 matrix shape of the intermediate coefficients and the above orthogonal transform matrix of the 32×32 array, thereby reproducing the 32×32 array of the prediction residuals. The inverse quantization/inverse transform unit 106 performs a similar process on each of the sub-blocks of the 32×32 array. In contrast, if no division is selected as illustrated in FIG. 7A, the inverse quantization/inverse transform unit 106 inversely quantizes the 32×32 array of the quantized coefficients generated by the transform/quantization unit 105, using the quantization matrix illustrated in FIG. 8C, thereby reproducing the 32×32 array of the orthogonal transform coefficients. The inverse quantization/inverse transform unit 106 then performs the multiplication of the above transpose of the 32×64 array and the orthogonal transform matrix of the 32×32 array, thereby calculating a 32×64 matrix shape of intermediate coefficients. The inverse quantization/inverse transform unit 106 performs the multiplication of these 32×64 matrix shape of intermediate coefficients and the above orthogonal transform matrix of the 64×32 array, thereby reproducing the 64×64 array of the prediction residuals. In the present exemplary embodiment, the inverse quantization process is executed using the same quantization matrix as the quantization matrix used by the transform/quantization unit 105 according to the size of the sub-blocks. The reproduced prediction residuals are output to the image reconstruction unit 107.

The image reconstruction unit 107, based on the prediction information input from the prediction unit 104, appropriately references data required to reproduce the predicted image stored in the frame memory 108, thereby reproducing the predicted image. The image reconstruction unit 107 then reproduces the image data based on the reproduced predicted image and the reproduced prediction residuals input from the inverse quantization/inverse transform unit 106, inputs and stores the image data to the frame memory 108.

The in-loop filter unit 109 reads the reconstruction image from the frame memory 108 and performs an in-loop filter process, such as deblocking filtering, on the reconstruction image. The in-loop filter unit 109 then inputs the image subjected to the filter process to the frame memory 108 again and stores the image in the frame memory 108 again.

The encoding unit 110 performs entropy encoding, in units of blocks, on the quantized coefficients generated by the transform/quantization unit 105 and the prediction information input from the prediction unit 104, thereby generating code data. A method for the entropy encoding is not particularly specified. For example, Golomb coding, arithmetic coding, or Huffman coding can be used. The generated code data is output to the integration/encoding unit 111.

The integration/encoding unit 111 multiplexes code data of the above header with the code data input from the encoding unit 110, thereby forming a bit stream. Ultimately, the bit stream is output from the terminal 112 to outside.

Figure 6A:
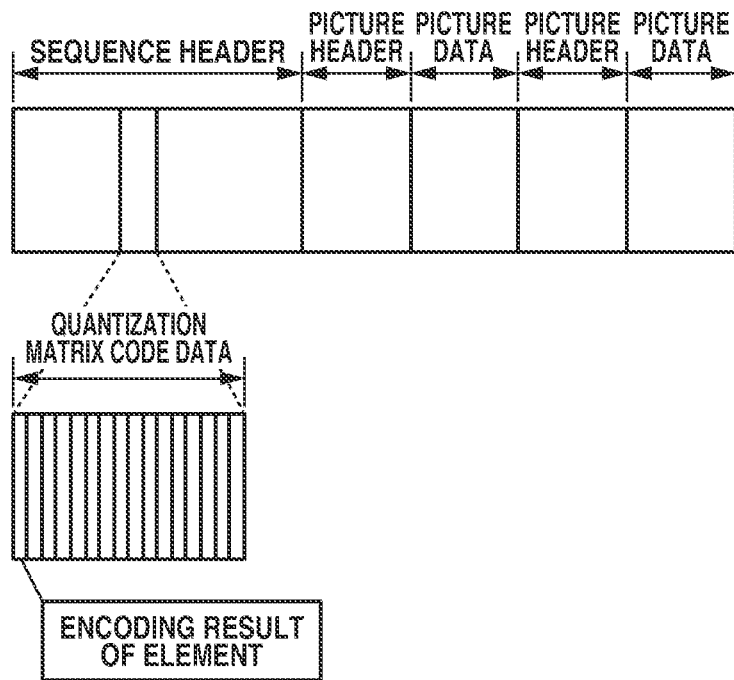
FIG. 6A is a diagram illustrating an example of a bit stream output in the first exemplary embodiment.

FIG. 6A is an example of the bit stream output in the first exemplary embodiment. A sequence header includes code data of the base quantization matrix and is composed of the results of encoding the elements. The position where the code data of the base quantization matrix is encoded, however, is not limited to this. A configuration may be employed in which the code data of the base quantization matrix is encoded in a picture header portion or another header portion. In a case where quantization matrices are changed in a single sequence, the quantization matrices can be updated by newly encoding the base quantization matrix. At this time, all the quantization matrices may be rewritten, or some of the quantization matrices can also be changed by specifying the size of the sub-blocks of a quantization matrix corresponding to a quantization matrix to be rewritten.

Figure 3:
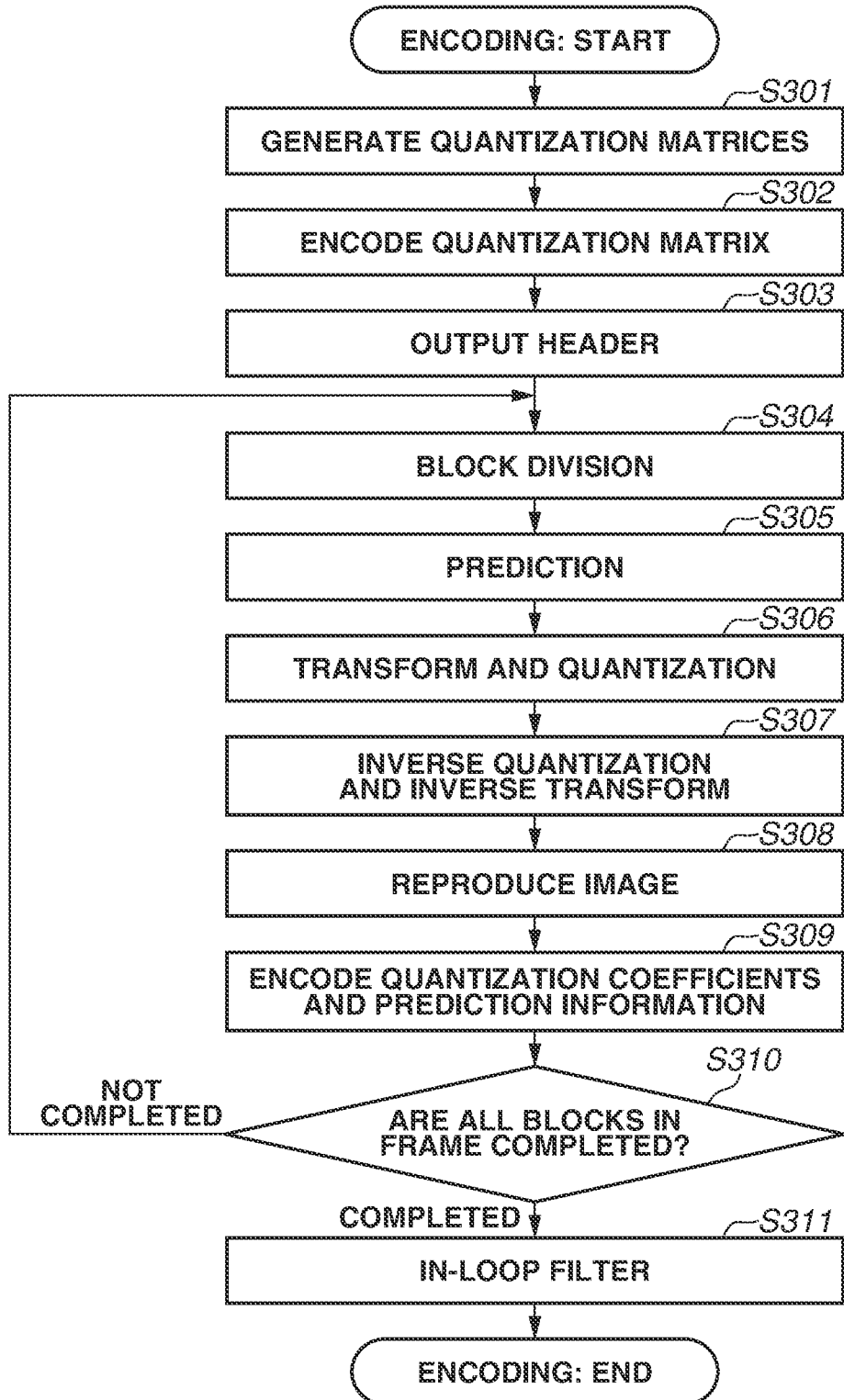
FIG. 3 is a flowchart illustrating an image encoding process performed by the image coding apparatus according to the first exemplary embodiment.

FIG. 3 is a flowchart illustrating an encoding process performed by the image coding apparatus according to the first exemplary embodiment.

In step S301, the quantization matrix holding unit 103 generates and holds two-dimensional quantization matrices before the encoding of an image. In the present exemplary embodiment, the quantization matrix holding unit 103 generates and holds the base quantization matrix illustrated in FIG. 8A and the quantization matrices illustrated in FIGS. 8B and 8C generated from the base quantization matrix.

In step S302, the quantization matrix encoding unit 113 scans the base quantization matrix used to generate the quantization matrices in step S301, and calculates the difference between two successive elements in scanning order, thereby generating a one-dimensional difference matrix. In the present exemplary embodiment, the difference matrix illustrated in FIG. 10 is generated from the base quantization matrix illustrated in FIG. 8A using the scanning method illustrated in FIG. 9. The quantization matrix encoding unit 113 further encodes the generated difference matrix, thereby generating quantization matrix code data.

In step S303, the integration/encoding unit 111 encodes header information required to encode image data, together with the generated quantization matrix code data and outputs the header information.

In step S304, the block division unit 102 divides an input image in units of frames into units of basic blocks of a 64×64 array of pixels.

In step S305, the prediction unit 104 executes, using the above prediction method, a prediction process on the image data in units of basic blocks generated in step S304, thereby generating prediction information, such as sub-block division information and a prediction mode, and predicted image data. In the present exemplary embodiment, two types of sub-block sizes are used; the two types of sub-block sizes are the division into the sub-blocks of the 32×32 array of pixels illustrated in FIG. 7B and the sub-block of the 64×64 array of pixels illustrated in FIG. 7A. Further, the prediction unit 104 calculates prediction residuals from the input image data and the predicted image data.

In step S306, the transform/quantization unit 105 orthogonally transforms the prediction residuals calculated in step S305, thereby generating orthogonal transform coefficients. The transform/quantization unit 105 further quantizes the orthogonal transform coefficients using the quantization matrices generated and held in step S301 and the quantization parameter, thereby generating quantized coefficients. Specifically, the transform/quantization unit 105 performs the multiplication for the prediction residuals in the sub-blocks of the 32×32 array of pixels in FIG. 7B by using an orthogonal transform matrix of a 32×32 array and the transpose of the orthogonal transform matrix of the 32×32 array, thereby generating a 32×32 array of orthogonal transform coefficients. In contrast, the transform/quantization unit 105 performs the multiplication for the prediction residuals in the sub-block of the 64×64 array of pixels illustrated in FIG. 7A by using an orthogonal transform matrix of a 64×32 array and the transpose of the orthogonal transform matrix of the 64×32 array, thereby generating a 32×32 array of orthogonal transform coefficients. In the present exemplary embodiment, the transform/quantization unit 105 quantizes the 32×32 array of the orthogonal transform coefficients by using the quantization matrix illustrated in FIG. 8B for the orthogonal transform coefficients corresponding to the sub-blocks of the 32×32 array in FIG. 7B and the quantization matrix illustrated in FIG. 8C for the orthogonal transform coefficients corresponding to the sub-block of the 64×64 array in FIG. 7A.

In step S307, the inverse quantization/inverse transform unit 106 inversely quantizes the quantized coefficients generated in step S306 by using the quantization matrices generated and held in step S301 and the quantization parameter, thereby reproducing the orthogonal transform coefficients. The inverse quantization/inverse transform unit 106 further inversely orthogonally transforms the orthogonal transform coefficients, thereby reproducing the prediction residuals. In this step, the inverse quantization process is performed by using the same quantization matrix as the quantization matrix used in step S306. Specifically, the inverse quantization/inverse transform unit 106 performs the inverse quantization process using the quantization matrix illustrated in FIG. 8B for the 32×32 array of the quantized coefficients corresponding to the sub-blocks of 32×32 array of pixels in FIG. 7B, thereby reproducing the 32×32 array of the orthogonal transform coefficients. The inverse quantization/inverse transform unit 106 then performs multiplication for the 32×32 array of the orthogonal transform coefficients using an orthogonal transform matrix of a 32×32 array and the transpose of the 32×32 array of the orthogonal transform matrix, thereby reproducing a 32×32 pixel array of the prediction residuals. In contrast, the inverse quantization/inverse transform unit 106 performs the inverse quantization process using the quantization matrix in FIG. 8C for the 32×32 array of the quantized coefficients corresponding to the sub-block of the 64×64 array of pixels in FIG. 7A, thereby reproducing the 32×32 array of the orthogonal transform coefficients. The inverse quantization/inverse transform unit 106 performs the multiplication for the 32×32 array of the orthogonal transform coefficients by using an orthogonal transform matrix of a 64×32 array and the transpose of the orthogonal transform matrix of the 64×32 array, thereby reproducing the 64×64 pixel array of the prediction residuals.

In step S308, the image reconstruction unit 107 reproduces the predicted image based on the prediction information generated in step S305. The image reconstruction unit 107 further reconstructs the image data based on the reconstructed predicted image and the prediction residuals generated in step S307.

In step S309, the encoding unit 110 encodes the prediction information generated in step S305 and the quantized coefficients generated in step S306, thereby generating code data. The encoding unit 110 also generates a bit stream including other code data.

In step S310, the image coding apparatus determines whether the encoding of all the basic blocks in this frame is completed. If the encoding is completed, the processing proceeds to step S311. If not, the processing returns to step S304 with the next basic block as a target.

In step S311, the in-loop filter unit 109 performs an in-loop filter process on the image data reconstructed in step S308, thereby generating the image subjected to the filter process. Then, the processing ends.

By using the above configuration and operation, it is possible to reduce the amount of calculation and also control quantization with respect to each frequency component, and thereby subjective image quality is improved. Particularly in step S305, the number of orthogonal transform coefficients is reduced, and a quantization process using a quantization matrix corresponding to the reduced orthogonal transform coefficients is performed, whereby it is possible to reduce the amount of calculation and also control quantization with respect to each frequency component, and thereby subjective image quality is improved. In a case where the number of orthogonal transform coefficients is reduced, and only a low-frequency portion is quantized and encoded, a quantization matrix obtained by enlarging only a low-frequency portion of a base quantization matrix as illustrated in FIG. 8C is used, whereby it is possible to achieve optimal quantization control of the low-frequency portion. The low-frequency portion in this case is the range where the x-coordinates are 0 to 3 and the y-coordinates are 0 to 3 in the example of FIG. 8C.

In the present exemplary embodiment, a configuration is employed in which only the base quantization matrix in FIG. 8A used in common to generate the quantization matrices illustrated in FIGS. 8B and 8C is encoded for the purpose of reducing the encoding amount. Alternatively, a configuration may be employed in which the quantization matrices themselves illustrated in FIGS. 8B and 8C are encoded. In this case, a unique value can be set with respect to each frequency component of each quantization matrix. Thus, it is possible to achieve fine quantization control with respect to each frequency component. Yet alternatively, a configuration can also be employed in which an individual base quantization matrix is set for each of the quantization matrices in FIGS. 8B and 8C, and each base quantization matrix is encoded. In this case, it is possible to perform different types of quantization control for a 32×32 array of orthogonal transform coefficients and a 64×64 array of orthogonal transform coefficients, and thereby strict control of subjective image quality is achieved. Further, in this case, the quantization matrix corresponding to the 64×64 array of the orthogonal transform coefficients may be obtained by, instead of enlarging an upper left 4×4 portion of the base quantization matrix of the 8×8 array eight times, enlarging the entirety of the base quantization matrix of 8×8 array four times. In this manner, it is possible to achieve fine quantization control also for a 64×64 array of orthogonal transform coefficients.

Figure 6B:
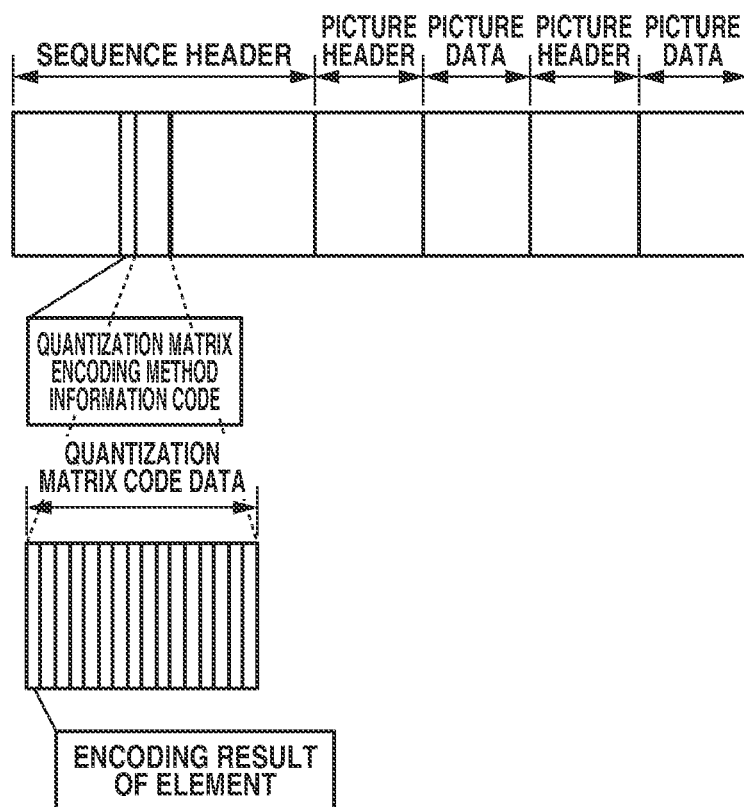
FIG. 6B is a diagram illustrating an example of a bit stream output in the first exemplary embodiment.

In the present exemplary embodiment, a configuration is employed in which a quantization matrix for a sub-block of a 64×64 array having been subjected to zeroing out is uniquely determined. Alternatively, a configuration may be employed in which a quantization matrix is selectable by introducing an identifier. For example, FIG. 6B illustrates an example in which the encoding of a quantization matrix for a sub-block of 64×64 array having been subjected to zeroing out is selective by newly introducing a quantization matrix encoding method information code. For example, if the quantization matrix encoding method information code indicates 0, the quantization matrix in FIG. 8C, which is an independent quantization matrix, is used for orthogonal transform coefficients corresponding to a sub-block of a 64×64 array of pixels having been subjected to zeroing out. If the encoding method information code indicates 1, the quantization matrix in FIG. 8B, which is a normal quantization matrix used for a sub-block that is not subjected to zeroing out, is used for a sub-block of a 64×64 array of pixels having been subjected to zeroing out. If, in contrast, the encoding method information code indicates 2, not the base quantization matrix of the 8×8 array but all the elements of a quantization matrix used for a sub-block of a 64×64 array of pixels having been subjected to zeroing out are encoded. It is thereby possible to selectively achieve a reduction in the encoding amount of a quantization matrix and unique quantization control of a sub-block having been subjected to zeroing out.

In the present exemplary embodiment, a sub-block having been subjected to zeroing out is only a sub-block of a 64×64 array. A sub-block having been subjected to zeroing out, however, is not limited to this. For example, a 32×32 array of orthogonal transform coefficients at the lower half or the right half of orthogonal transform coefficients corresponding to a sub-block of a 32×64 array and a sub-block of a 64×32 array illustrated in FIGS. 7C and 7B may be forcibly set to 0. In this case, only a 32×32 array of orthogonal transform coefficients at the upper half or the left half are used as a target to be quantized and encoded. Thus, a quantization process is performed on the 32×32 array of the orthogonal transform coefficients at the upper half or the left half using a quantization matrix different from that illustrated in FIG. 8B.

Figure 12B:
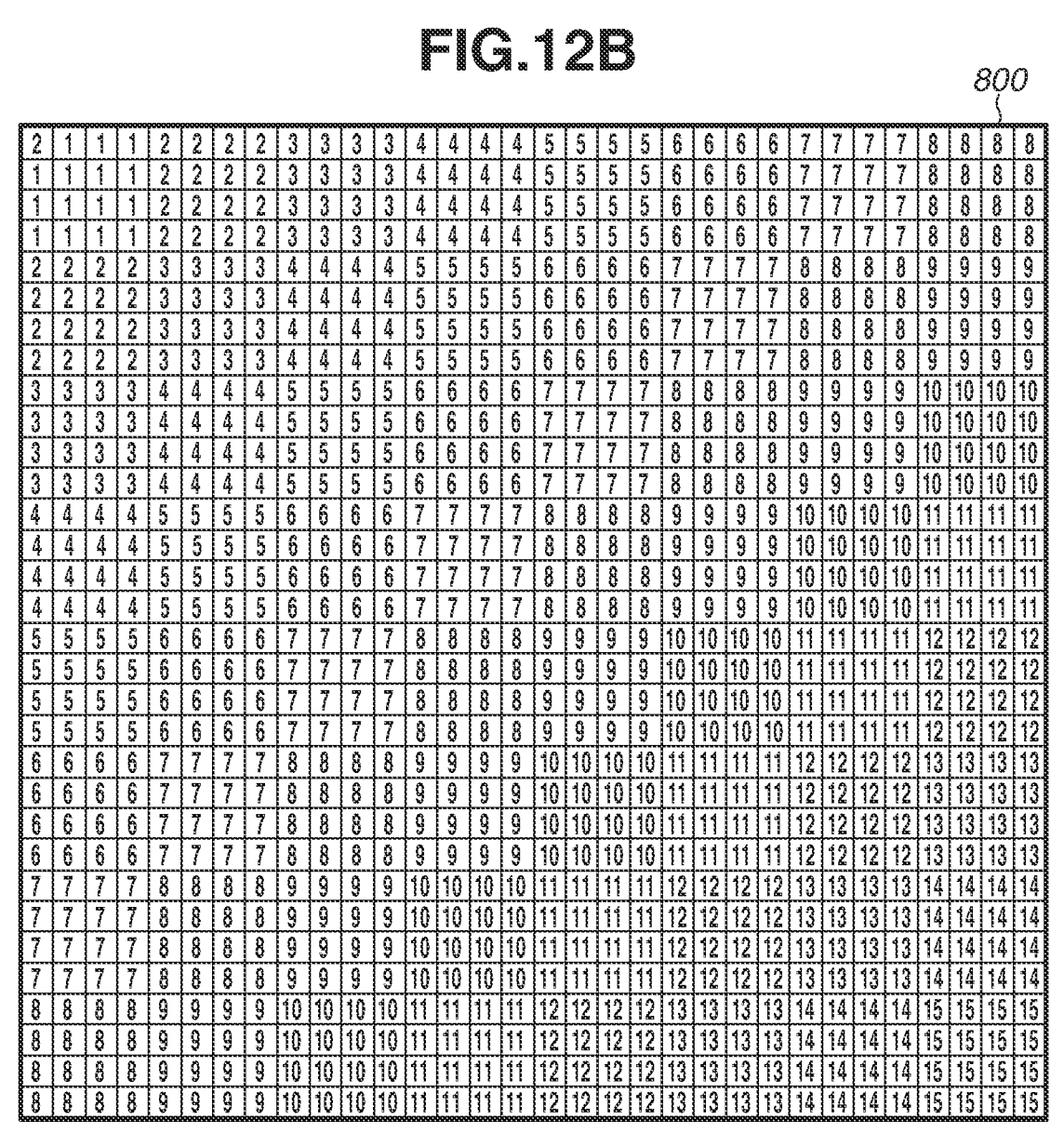
Figure 12C:
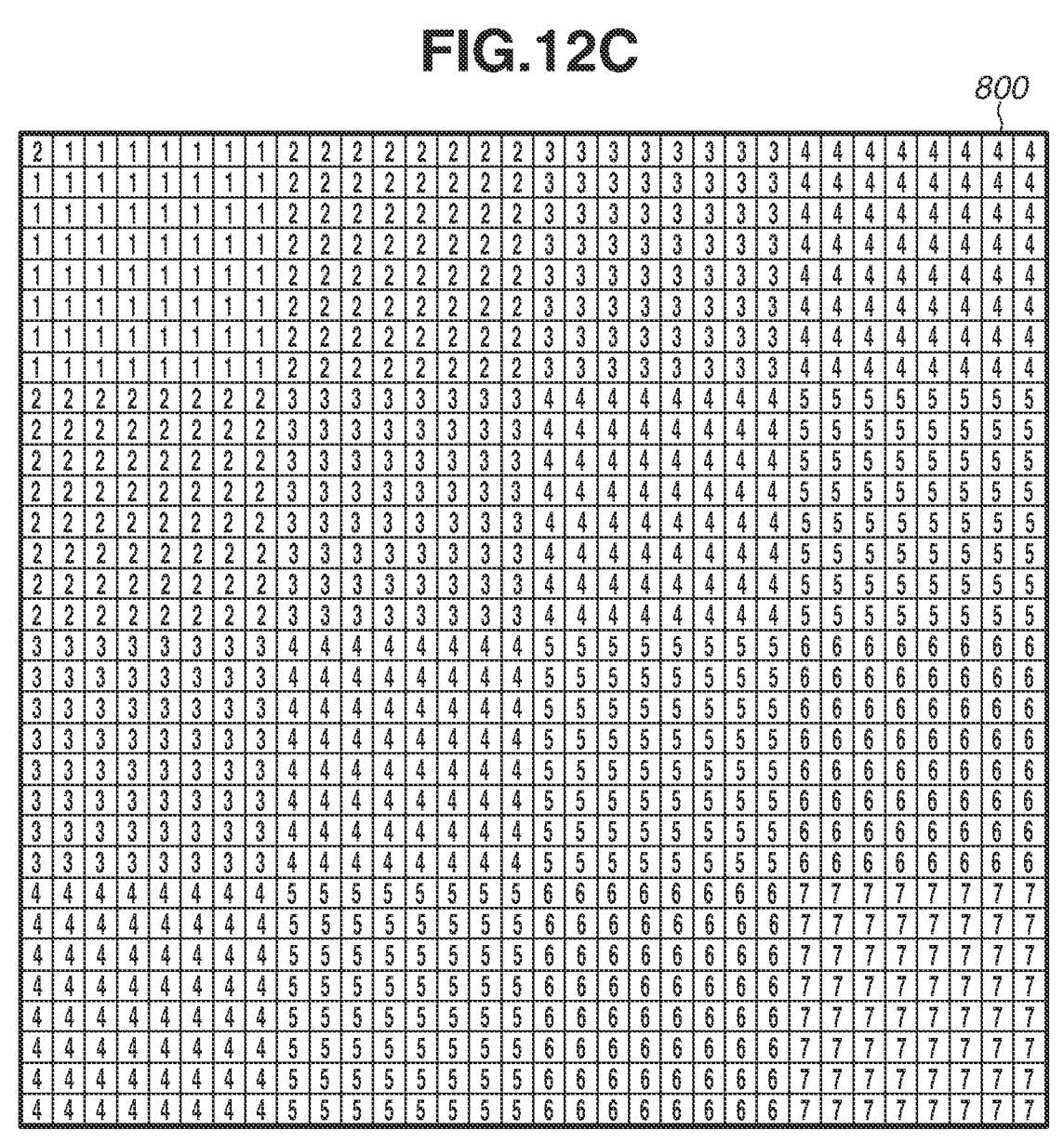

Further, a configuration may be employed in which among generated orthogonal transform coefficients, the value of a quantization matrix corresponding to a DC coefficient located at the upper left end, which is considered as having the greatest influence on image quality, is set and encoded separately from the values of the elements of the base matrix of the 8×8 array. FIGS. 12B and 12C illustrate examples where the value of the element located at the upper left end corresponding to a DC component is changed as compared with FIGS. 8B and 8C. In this case, information indicating "2" located in the DC portion is separately encoded, in addition to information regarding the base quantization matrix in FIG. 8A, whereby it is possible to set quantization matrices illustrated in FIGS. 12B and 12C. Whereby, it is possible to perform finer quantization control of a DC component having the greatest influence on image quality among orthogonal transform coefficients.

Second Exemplary Embodiment

Figure 2:
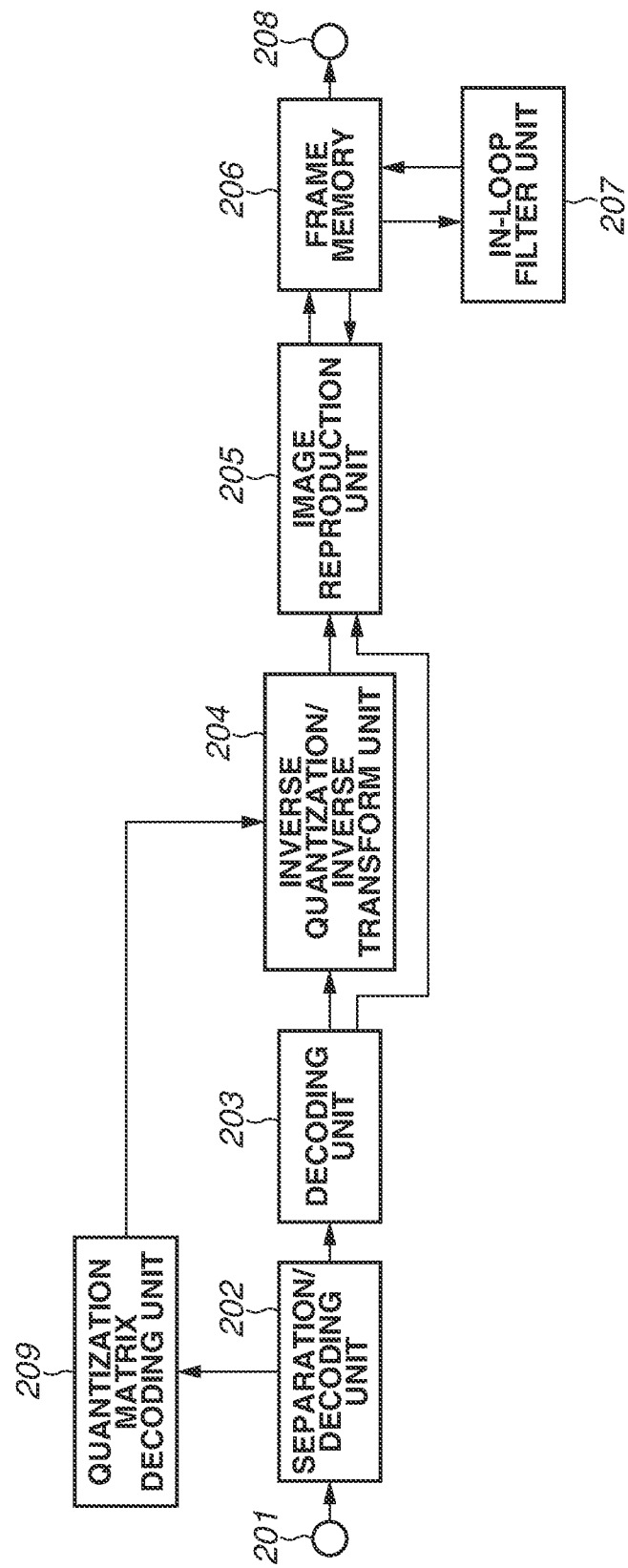
FIG. 2 is a block diagram illustrating a configuration of an image decoding apparatus according to a second exemplary embodiment.

FIG. 2 is a block diagram illustrating the configuration of an image decoding apparatus according to a second exemplary embodiment of the present invention. The present exemplary embodiment is described using as an example an image decoding apparatus that decodes encoded data generated in the first exemplary embodiment.

To a terminal 201, an encoded bit stream is input.

A separation/decoding unit 202 separates the bit stream into information regarding a decoding process and code data regarding coefficients and also decodes code data present in a header portion of the bit stream. In the present exemplary embodiment, the separation/decoding unit 202 separates a quantization matrix code and outputs the quantization matrix code to the subsequent stage. The separation/decoding unit 202 performs the opposite operation to that of the integration/encoding unit 111 in FIG. 1.

A quantization matrix decoding unit 209 executes the process of decoding the quantization matrix code from the bit stream, thereby reproducing a base quantization matrix, and of further generating quantization matrices from the base quantization matrix.

A decoding unit 203 decodes the code data output from the separation/decoding unit 202, thereby reproducing (deriving) quantized coefficients and prediction information.

Similarly to the inverse quantization/inverse transform unit 106 in FIG. 1, an inverse quantization/inverse transform unit 204 inversely quantizes the quantized coefficients using the reproduced quantization matrices and the quantization parameter, thereby obtaining orthogonal transform coefficients. The inverse quantization/inverse transform unit 204 further inversely orthogonally transforms the orthogonal transform coefficients, thereby reproducing prediction residuals. Information for deriving the quantization parameter is also decoded from the bit stream by the decoding unit 203. The function of performing the inverse quantization and the function of performing the inverse quantization may be separately configured.

A frame memory 206 stores image data of a reproduced picture.

Based on the input prediction information, an image reconstruction unit 205 appropriately references the frame memory 206, thereby generating predicted image data. The image reconstruction unit 205 then generates reconstruction image data based on the predicted image data and the prediction residuals reproduced by the inverse quantization/inverse transform unit 204 and outputs the reconstruction image data.

Similarly to the in-loop filter unit 109 in FIG. 1, an in-loop filter unit 207 performs an in-loop filter process, such as deblocking filtering, on the reconstruction image and outputs the image subjected to the filter process.

A terminal 208 outputs the reconstructed image data to outside.

An image decoding operation performed by the image decoding apparatus will be described below. In the present exemplary embodiment, a configuration is employed in which a bit stream generated in the first exemplary embodiment is input in units of frames (in units of pictures).

In FIG. 2, a bit stream of a single frame input from the terminal 201 is input to the separation/decoding unit 202. The separation/decoding unit 202 separates the bit stream into information regarding a decoding process and code data regarding coefficients and decodes code data present in a header portion of the bit stream. More specifically, the separation/decoding unit 202 reproduces quantization matrix code data. In the present exemplary embodiment, the separation/decoding unit 202 first extracts quantization matrix code data from the sequence header of the bit stream illustrated in FIG. 6A and outputs the quantization matrix code data to the quantization matrix decoding unit 209. In the present exemplary embodiment, the separation/decoding unit 202 extracts and outputs quantization matrix code data corresponding to the base quantization matrix illustrated in FIG. 8A. Next, the separation/decoding unit 202 reproduces code data in units of basic blocks of picture data and outputs the code data to the decoding unit 203.

The quantization matrix decoding unit 209 first decodes the input quantization matrix code data, thereby reproducing the one-dimensional difference matrix illustrated in FIG. 10. In the present exemplary embodiment, the quantization matrix code data is decoded using the encoding table illustrated in FIG. 11A similarly to the first exemplary embodiment. The encoding table, however, is not limited to this. Another encoding table may be used so long as the same encoding table as that in the first exemplary embodiment is used. The quantization matrix decoding unit 209 further reproduces two-dimensional quantization matrices from the reproduced one-dimensional difference matrix. The quantization matrix decoding unit 209 performs the opposite operation to the operation of the quantization matrix encoding unit 113 in the first exemplary embodiment. That is, in the present exemplary embodiment, the base quantization matrix illustrated in FIG. 8A is reproduced from the difference matrix illustrated in FIG. 10 using the scanning method illustrated in FIG. 9 and is held. Specifically, the quantization matrix decoding unit 209 sequentially adds the difference values in the difference matrix to the above initial value, thereby reproducing the elements of a quantization matrix. The quantization matrix decoding unit 209 then associates the reproduced one-dimensional elements with the elements of the two-dimensional quantization matrix in order according to the scanning method illustrated in FIG. 9, thereby reproducing the two-dimensional quantization matrix.

The quantization matrix decoding unit 209 further enlarges, similarly to the first exemplary embodiment, the reproduced base quantization matrix, thereby generating the two types of quantization matrices of a 32×32 array illustrated in FIGS. 8B and 8C. The quantization matrix in FIG. 8B is a quantization matrix of a 32×32 array obtained by enlarging the base quantization matrix of the 8×8 array illustrated in FIG. 8A four times by repeating the elements of the base quantization matrix of the 8×8 array four times in the vertical and horizontal directions.

In contrast, the quantization matrix in FIG. 8C is a quantization matrix of a 32×32 array obtained by enlarging the base quantization matrix illustrated in FIG. 8A by repeating the elements of the upper left 4×4 portion of the base quantization matrix eight times in the vertical and horizontal directions. The quantization matrices to be generated, however, are not limited to these. In a case where there is also a size other than 32×32 as the size of quantized coefficients to be inversely quantized at the subsequent stage, quantization matrices corresponding to the size of quantized coefficients to be inversely quantized, such as 16×16, 8×8, or 4×4, may be generated. These generated quantization matrices are held and used for an inverse quantization process at the subsequent stage.

The decoding unit 203 decodes the code data from the bit stream, thereby reproducing quantized coefficients and prediction information. The decoding unit 203 determines the size of sub-blocks as a decoding target, based on the decoded prediction information. Furthermore, the reproduced quantized coefficients are output to the inverse quantization/inverse transform unit 204, and the reproduced prediction information is output to the image reconstruction unit 205. In the present exemplary embodiment, a 32×32 array of quantized coefficients are reproduced for each sub-block, regardless of the size of the sub-blocks as the decoding target, i.e., whether the size of the sub-blocks is 64×64 in FIG. 7A or 32×32 in FIG. 7B.

The inverse quantization/inverse transform unit 204 inversely quantizes the input quantized coefficients using the quantization matrices reproduced by the quantization matrix decoding unit 209 and the quantization parameter, thereby generating orthogonal transform coefficients. The inverse quantization/inverse transform unit 204 further inversely orthogonally transforms the orthogonal transform coefficients, thereby reproducing prediction residuals. The inverse quantization/inverse orthogonal transform process is more specifically described below.

If the sub-block division of the 32×32 array in FIG. 7B is selected, the 32×32 array of the quantized coefficients reproduced by the decoding unit 203 are inversely quantized using the quantization matrix illustrated in FIG. 8B, and thereby reproducing a 32×32 array of orthogonal transform coefficients. Then, the above transpose of the 32×32 array and the orthogonal transform matrix of the 32×32 array are multiplied by each other, and thereby a 32×32 matrix shape of intermediate coefficients is calculated. These 32×32 matrix shape of the intermediate coefficients and the above-described orthogonal transform matrix of the 32×32 array are multiplied by each other, and thereby a 32×32 array of prediction residuals is reproduced. A similar process is performed on each of the sub-blocks of the 32×32 array.

In contrast, if no division is selected as illustrated in FIG. 7A, the 32×32 array of the quantized coefficients reproduced by the decoding unit 203 are inversely quantized using the quantization matrix in FIG. 8C, and thereby a 32×32 array of orthogonal transform coefficients is reproduced. Then, the above-described transpose of the 32×64 array and the orthogonal transform matrix of the 32×32 array are multiplied by each other, and thereby a 32×64 matrix shape of intermediate coefficients is calculated. These 32×64 matrix shape of the intermediate coefficients and the above orthogonal transform matrix of the 64×32 array are multiplied by each other, and thereby a 64×64 array of prediction residuals is reproduced.

The reproduced prediction residuals are output to the image reconstruction unit 205. In the present exemplary embodiment, the quantization matrix to be used in the inverse quantization process is determined according to the size of the sub-blocks as the decoding target determined based on the prediction information reproduced by the decoding unit 203. That is, the quantization matrix in FIG. 8B is used, in the inverse quantization process, for each of the sub-blocks of 32×32 array in FIG. 7B, and the quantization matrix in FIG. 8C is used for the sub-block of 64×64 array in FIG. 7A. The quantization matrix to be used, however, is not limited to this, and only needs to be the same as the quantization matrix used by the transform/quantization unit 105 and the inverse quantization/inverse transform unit 106 in the first exemplary embodiment.

Based on the prediction information input from the decoding unit 203, the image reconstruction unit 205 appropriately references the frame memory 206 and acquires data required to reconstruct a predicted image, thereby reconstructing the predicted image. In the present exemplary embodiment, two types of prediction methods, namely intra prediction and inter prediction, are used similarly to the prediction unit 104 according to the first exemplary embodiment. Alternatively, as described above, a prediction method obtained by combining the intra prediction and the inter prediction may be used. Similarly to the first exemplary embodiment, the prediction process is performed in units of sub-blocks.

The specific prediction process is similar to that of the prediction unit 104 according to the first exemplary embodiment, and therefore is not described. The image reconstruction unit 205 reconstructs image data based on the predicted image generated in the prediction process and the prediction residuals input from the inverse quantization/inverse transform unit 204. Specifically, the image reconstruction unit 205 adds the predicted image and the prediction residuals, thereby reconstructing image data. The reconstructed image data is appropriately stored in the frame memory 206. The stored image data is appropriately referenced when another sub-block is predicted.

Similarly to the in-loop filter unit 109 in FIG. 1, the in-loop filter unit 207 reads the reproduction image from the frame memory 206 and performs an in-loop filter process such as deblocking filtering on the reconstruction image. Then, the image subjected to the filter process is input to the frame memory 206 again.

The reconstruction image stored in the frame memory 206 is ultimately output from the terminal 208 to outside. The reconstruction image is output to, for example, an external display device.

Figure 4:
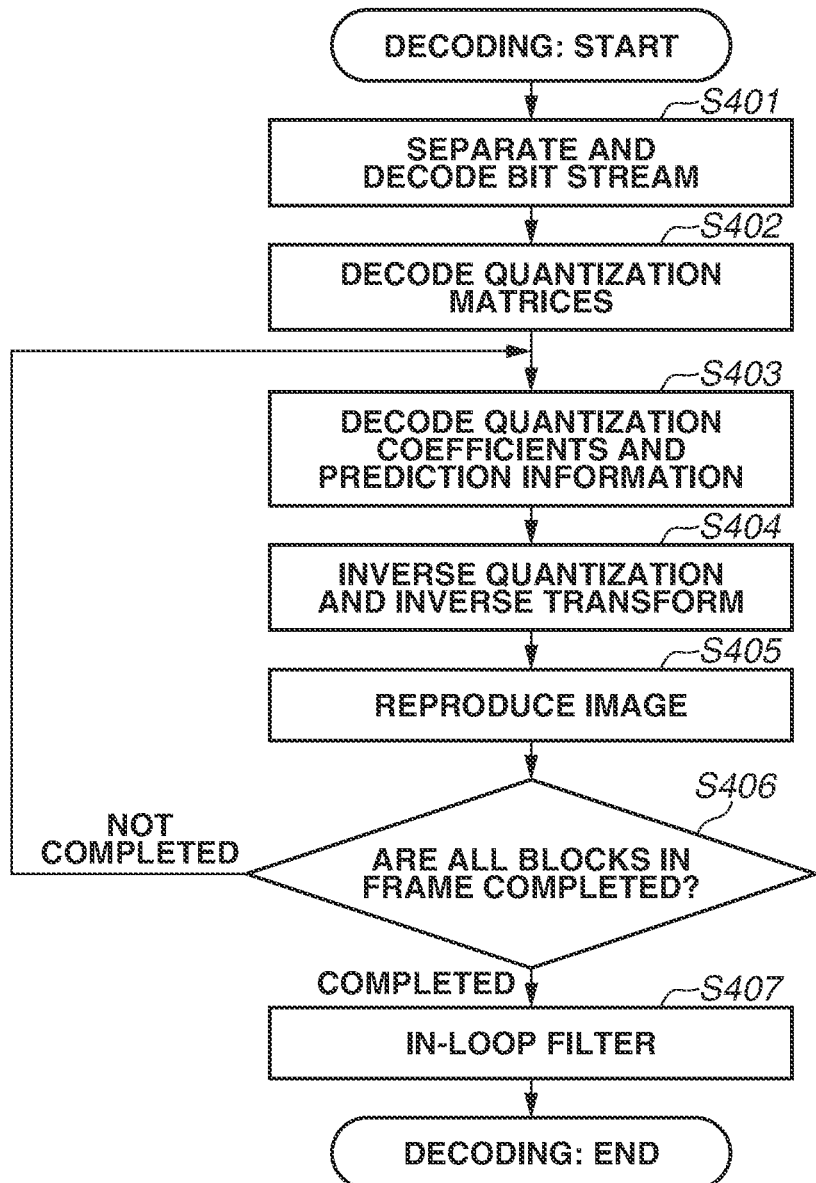
FIG. 4 is a flowchart illustrating an image decoding process performed by the image decoding apparatus according to the second exemplary embodiment.

FIG. 4 is a flowchart illustrating an image decoding process performed by the image decoding apparatus according to the second exemplary embodiment.

In step S401, the separation/decoding unit 202 separates a bit stream into information regarding a decoding process and code data regarding coefficients and decodes code data in a header portion. More specifically, the separation/decoding unit 202 reproduces quantization matrix code data.

In step S402, the quantization matrix decoding unit 209 first decodes the quantization matrix code data reproduced in step S401, thereby reproducing the one-dimensional difference matrix illustrated in FIG. 10. The quantization matrix decoding unit 209 then reproduces a two-dimensional base quantization matrix from the reproduced one-dimensional difference matrix. The quantization matrix decoding unit 209 further enlarges the reproduced two-dimensional base quantization matrix, thereby generating quantization matrices.

That is, the quantization matrix decoding unit 209 reproduces, in the present exemplary embodiment, the base quantization matrix illustrated in FIG. 8A from the difference matrix illustrated in FIG. 10 using the scanning method illustrated in FIG. 9. The quantization matrix decoding unit 209 further enlarges the reproduced base quantization matrix, thereby generating the quantization matrices illustrated in FIGS. 8B and 8C. The quantization matrix decoding unit 209 then holds the quantization matrices.

In step S403, the decoding unit 203 decodes the code data separated in step S401, thereby reproducing quantized coefficients and prediction information. The decoding unit 203 further determines the size of sub-blocks as a decoding target based on the decoded prediction information. In the present exemplary embodiment, a 32×32 array of quantized coefficients is reproduced for each sub-block, regardless of the size of the sub-blocks as the decoding target, i.e., whether the size of the sub-blocks is 64×64 in FIG. 7A or 32×32 in FIG. 7B.

In step S404, the inverse quantization/inverse transform unit 204 inversely quantizes the quantized coefficients using the quantization matrices reproduced in step S402, thereby obtaining orthogonal transform coefficients. The inverse quantization/inverse transform unit 204 further inversely orthogonally transforms the orthogonal transform coefficients, thereby reproducing prediction residuals. In the present exemplary embodiment, the quantization matrix to be used in the inverse quantization process is determined according to the size of the sub-blocks as the decoding target determined based on the prediction information reproduced in step S403. That is, in the inverse quantization process, the quantization matrix in FIG. 8B is used for each of the sub-blocks of the 32×32 array in FIG. 7B, and the quantization matrix in FIG. 8C is used for the sub-block of the 64×64 array in FIG. 7A. The quantization matrix to be used, however, is not limited to this, and only needs to be the same as the quantization matrix used in steps S306 and S307 in the first exemplary embodiment.

In step S405, the image reconstruction unit 205 reconstructs a predicted image, based on the prediction information generated in step S403. In the present exemplary embodiment, two types of prediction methods, namely the intra prediction and the inter prediction, are used, similarly to step S305 in the first exemplary embodiment. The image reconstruction unit 205 further reproduces image data based on the reconstructed predicted image and the prediction residuals generated in step S404.

In step S406, the image decoding apparatus determines whether the decoding of all the basic blocks in this frame is completed. If the decoding is completed, the processing proceeds to step S407. If not, the processing returns to step S403 with the next basic block as a target.

In step S407, the in-loop filter unit 207 performs an in-loop filter process on the image data reconstructed in step S405, thereby generating the image subjected to the filter process. Then, the processing ends.

By the above configuration and operation, it is possible to decode a bit stream in which subjective image quality is improved by controlling quantization with respect to each frequency component using a quantization matrix also for a sub-block which is generated in the first exemplary embodiment and in which only low-frequency orthogonal transform coefficients are quantized and encoded. For a sub-block in which only low-frequency orthogonal transform coefficients are quantized and encoded, a quantization matrix obtained by enlarging only a low-frequency portion of a base quantization matrix as illustrated in FIG. 8C is used, whereby it is possible to decode a bit stream in which optimal quantization control of the low-frequency portion is performed.

In the present exemplary embodiment, to reduce the encoding amount, a configuration is employed in which only the base quantization matrix in FIG. 8A used in common to generate the quantization matrices in FIGS. 8B and 8C is decoded. Alternatively, a configuration may be employed in which the quantization matrices themselves in FIGS. 8B and 8C are decoded. In this case, a unique value can be set with respect to each frequency component of each quantization matrix. It is thus possible to decode a bit stream in which fine quantization control is achieved with respect to each frequency component.

Yet alternatively, a configuration can also be employed in which an individual base quantization matrix is set for each of the quantization matrices illustrated in FIGS. 8B and 8C, and each base quantization matrix is decoded. In this case, it is possible to perform different types of quantization control on a 32×32 array of orthogonal transform coefficients and a 64×64 array of orthogonal transform coefficients, and thereby a bit stream in which more thorough control of subjective image quality is achieved can be decoded. Further, in this case, the quantization matrix corresponding to the 64×64 array of the orthogonal transform coefficients may be obtained by enlarging the entirety of the base quantization matrix of the 8×8 array four times instead of enlarging an upper left 4×4 portion of the base quantization matrix of the 8×8 array eight times. In this manner, it is possible to achieve fine quantization control also for a 64×64 array of orthogonal transform coefficients.

Further, in the present exemplary embodiment, a configuration is employed in which a quantization matrix for a sub-block of 64×64 array having been subjected to zeroing out is uniquely determined. Alternatively, a configuration may be employed in which a quantization matrix is selectable by introducing an identifier. For example, FIG. 6B illustrates an example where the encoding of a quantization matrix for a sub-block of a 64×64 array having been subjected to zeroing out is selective by newly introducing a quantization matrix encoding method information code. For example, if the quantization matrix encoding method information code indicates 0, the quantization matrix in FIG. 8C, which is an independent quantization matrix, is used for quantized coefficients corresponding to a sub-block of a 64×64 array having been subjected to zeroing out. If the encoding method information code indicates 1, the quantization matrix in FIG. 8B, which is a normal quantization matrix used for a sub-block that is not subjected to zeroing out, is used for a sub-block of a 64×64 array having been subjected to zeroing out. In contrast, if the encoding method information code indicates 2, not the base quantization matrix of the 8×8 array but all the elements of a quantization matrix used for a sub-block of a 64×64 array having been subjected to zeroing out are encoded. Consequently, it is possible to decode a bit stream in which a reduction in the encoding amount of a quantization matrix and unique quantization control of a sub-block having been subjected to zeroing out are selectively achieved.

In the present exemplary embodiment, a sub-block having been subjected to zeroing out is only a sub-block of a 64×64 array. A sub-block having been subjected to zeroing out, however, is not limited to this. For example, a configuration may be employed in which a 32×32 array of orthogonal transform coefficients at the lower half or the right half of orthogonal transform coefficients corresponding to a sub-block of a 32×64 array and a sub-block of a 64×32 array illustrated in FIGS. 7C and 7B are not decoded, and only quantized coefficients at the upper half or the left half are decoded. In this case, only a 32×32 array of orthogonal transform coefficients at the upper half or the left half are used as a target to be decoded and inversely quantized. Thus, a quantization process is performed on the 32×32 array of the orthogonal transform coefficients at the upper half or the left half using a quantization matrix different from that illustrated in FIG. 8B.

Further, a configuration may be employed in which among generated orthogonal transform coefficients, the value of a quantization matrix corresponding to a DC coefficient located at the upper left end, which is considered as having the greatest influence on image quality, is decoded and set separately from the values of the elements of the base matrix of the 8×8 array. FIGS. 12B and 12C illustrate examples where the value of the element located at the upper left end corresponding to a DC component is changed as compared with FIGS. 8B and 8C. In this case, in addition to information regarding the base quantization matrix in FIG. 8A, information indicating "2" located in the DC portion is separately decoded, whereby it is possible to set quantization matrices illustrated in FIGS. 12B and 12C. Consequently, it is possible to decode a bit stream in which finer quantization control of a DC component having the greatest influence on image quality among orthogonal transform coefficients is performed.

Third Exemplary Embodiment

The above exemplary embodiments have been described on the assumption that the processing units illustrated in FIGS. 1 and 2 are configured by hardware. However, the processing performed by the processing units illustrated in FIGS. 1 and 2 may be configured by a computer program.

Figure 5:
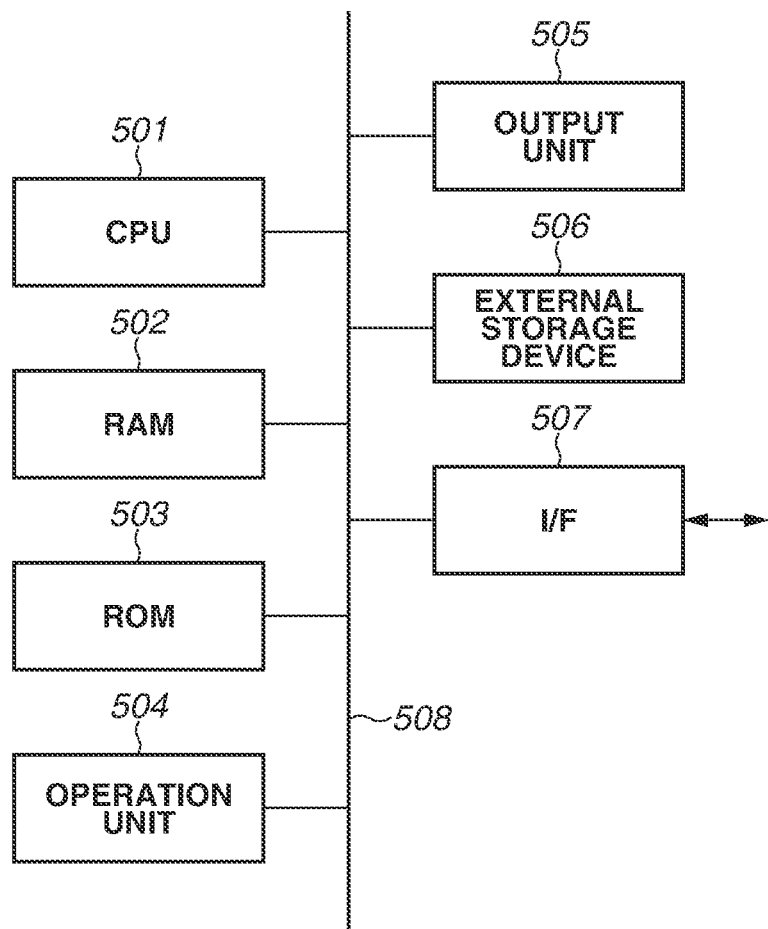
FIG. 5 is a block diagram illustrating an example of a hardware configuration of a computer applicable to the image coding apparatus and the image decoding apparatus according to the present invention.

FIG. 5 is a block diagram illustrating an example of the hardware configuration of a computer applicable to the image coding apparatus and the image decoding apparatus according to the above exemplary embodiments.

A central processing unit (CPU) 501 controls the entirety of the computer using a computer program and data stored in a random-access memory (RAM) 502 or a read-only memory (ROM) 503 and also executes the processes described above as being performed by an image processing apparatus according to the above exemplary embodiments. That is, the CPU 501 functions as the processing units illustrated in FIGS. 1 and 2.

The RAM 502 includes an area for temporarily storing a computer program and data loaded from an external storage device 506 and data acquired from outside via an interface (I/F) 507. The RAM 502 further includes a work area used by the CPU 501 to execute various processes. That is, for example, the RAM 502 can be allocated as a frame memory or the RAM 502 can appropriately provide various other areas.

The ROM 503 stores, for example, setting data and a boot program for the computer. An operation unit 504 is composed of a keyboard and a mouse. A user of the computer operates the operation unit 504 and thereby can input various instructions to the CPU 501. An output unit 505 outputs the processing result of the CPU 501. The output unit 505 is composed of, for example, a liquid crystal display.

The external storage device 506 is a large-capacity information storage device typified by a hard disk drive device.

The external storage device 506 stores an operating system (OS) and a computer program for the CPU 501 to achieve the functions of the components illustrated in FIGS. 1 and 2. Furthermore, the external storage device 506 may save pieces of image data as a processing target.

The computer program and the data saved in the external storage device 506 are appropriately loaded into the RAM 502 according to control of the CPU 501 and serve as a target to be processed by the CPU 501. To the I/F 507, a network, such as a local area network (LAN) or the Internet, and another device, such as a projection apparatus or a display device, can be connected. The computer can acquire or transmit various pieces of information via the I/F 507. A bus 508 connects the above components.

Operations based on the above configuration are controlled mainly by the CPU 501 performing the operations described in the above flowcharts.

Other Exemplary Embodiments

The exemplary embodiments can be achieved also by supplying a storage medium that records the code of a computer program for achieving the above functions to a system, and by the system reading and executing the code of the computer program. In this case, the code itself of the computer program read from the storage medium achieves the functions of the above exemplary embodiments, and the storage medium that stores the code of the computer program constitutes the present invention. The exemplary embodiments also include a case where based on an instruction from the code of the program, an OS operating on the computer performs a part or all of actual processing, and the above functions are achieved by the processing.

Further, the exemplary embodiments may be achieved in the following form. That is, the exemplary embodiments also include a case where the code of a computer program read from a storage medium is written to a memory included in a function extension card inserted into a computer or a function extension unit connected to the computer. Then, based on an instruction from the code of the computer program, a CPU included in the function extension card or the function extension unit performs a part or all of actual processing, thereby achieving the above-described functions.

In a case where the present invention is applied to the above-described storage medium, the storage medium stores the code of a computer program corresponding to the above-described flowcharts.

According to the above-described exemplary embodiments, it is possible to more efficiently execute a technique for forcibly setting some orthogonal transform coefficients to 0.

The present invention is not limited to the above-described exemplary embodiments, and can be changed and modified in various manners without departing from the spirit and the scope of the present invention. Thus, the following claims are appended to publicize the scope of the present invention.

The invention claimed is:

1. An image decoding apparatus that decodes, from a bit stream, an image using a plurality of blocks including a first block of a P×Q array of pixels (P and Q are integers), the image decoding apparatus comprising:
    a decoding unit configured to decode data corresponding to quantized transform coefficients from the bitstream;
    an inverse quantization unit configured to derive transform coefficients from the quantized transform coefficients by using a quantization matrix, the transform coefficients representing frequency components, wherein a quantization parameter is used to derive the transform coefficients in addition to the quantization matrix;
    an inverse transform unit configured to derive prediction residuals from the transform coefficients by performing inverse transform processing on the transform coefficients; and
    a reconstruction unit configured to derive a predicted image by using a prediction method in which an intra prediction method and an inter prediction method are combined, and to reconstruct image data by using the predicted image and the prediction residuals,
    wherein, in a case where a target block is the first block,
        (i) the inverse quantization unit is configured to derive an N×M array of transform coefficients from an N×M array of quantized transform coefficients by using a quantization matrix of an N×M array of elements, wherein N is an integer satisfying N<P, and M is an integer satisfying M<Q, and
        (ii) the inverse transform unit is configured to derive an N×Q array of intermediate values by performing multiplication of the N×M array of transform coefficients and a matrix of a M×Q array, and to derive a P×Q array of prediction residuals for the first block by performing multiplication of a matrix of a P×N array and the N×Q array of intermediate values, and
    wherein, in a case where a target block is a second block smaller than the first block,
        (i) the inverse quantization unit is configured to derive an array of transform coefficients for the second block from an array of quantized transform coefficients for the second block by using a quantization matrix for the second block, wherein a size of the array of transform coefficients for the second block, a size of the array of quantized transform coefficients for the second block, and a size of the quantization matrix for the second block are the same as a size of the second block, and
        (ii) the inverse transform unit is configured to derive an array of prediction residuals a size of which is the same as the size of the second block by performing multiplication using at least the array of transform coefficients for the second block and a matrix a size of which is the same as the size of the second block.

2. The image decoding apparatus according to claim 1, wherein the first block is a square block.

3. The image decoding apparatus according to claim 2, wherein the P and the Q are 64, and the N and the M are 32.

4. The image decoding apparatus according to claim 2, wherein the P and the Q are 128, and the N and the M are 32.

5. The image decoding apparatus according to claim 1, wherein the second block is a block of an N×M array of pixels.

6. The image decoding apparatus according to claim 1, wherein the first block is a non-square block.

7. An image decoding method for decoding, from a bit stream, an image using a plurality of blocks including a first block of a P×Q array of pixels (P and Q are integers), the image decoding method comprising:
    decoding data corresponding to quantized transform coefficients from the bitstream;
    deriving transform coefficients from the quantized transform coefficients by using a quantization matrix, the transform coefficients representing frequency components, wherein a quantization parameter is used to derive the transform coefficients in addition to the quantization matrix;

deriving prediction residuals from the transform coefficients by performing inverse transform processing on the transform coefficients; and deriving a predicted image by using a prediction method in which an intra prediction method and an inter prediction method are combined, and reconstructing image data by using the predicted image and the prediction residuals, wherein, in a case where a target block is the first block,
(i) an N×M array of transform coefficients is derived from an N×M array of quantized transform coefficients by using a quantization matrix of an N×M array of elements, wherein N is an integer satisfying N<P, and M is an integer satisfying M<Q, and
(ii) an N×Q array of intermediate values is derived by performing multiplication of the N×M array of transform coefficients and a matrix of a M×Q array, and a P×Q array of prediction residuals for the first block is derived by performing multiplication of a matrix of a P×N array and the N×Q array of intermediate values, and wherein, in a case where a target block is a second block smaller than the first block,
(i) an array of transform coefficients for the second block is derived from an array of quantized transform coefficients for the second block by using a quantization matrix for the second block, wherein a size of the array of transform coefficients for the second block, a size of the array of quantized transform coefficients for the second block, and a size of the quantization matrix for the second block are the same as a size of the second block, and
(ii) an array of prediction residuals a size of which is the same as the size of the second block is derived by performing multiplication using at least the array of transform coefficients for the second block and a matrix a size of which is the same as the size of the second block.

8. A non-transitory computer readable storage medium storing a program for causing a computer to execute an image decoding method for decoding, from a bit stream, an image using a plurality of blocks including a first block of a P×Q array of pixels (P and Q are integers), the image decoding method comprising:

decoding data corresponding to quantized transform coefficients from the bitstream;

deriving transform coefficients from the quantized transform coefficients by using a quantization matrix, the transform coefficients representing frequency components, wherein a quantization parameter is used to derive the transform coefficients in addition to the quantization matrix;

deriving prediction residuals from the transform coefficients by performing inverse transform processing on the transform coefficients; and deriving a predicted image by using a prediction method in which an intra prediction method and an inter prediction method are combined, and reconstructing image data by using the predicted image and the prediction residuals, wherein, in a case where a target block is the first block,
(i) an N×M array of transform coefficients is derived from an N×M array of quantized transform coefficients by using a quantization matrix of an N×M array of elements, wherein N is an integer satisfying N<P, and M is an integer satisfying M<Q, and
(ii) an N×Q array of intermediate values is derived by performing multiplication of the N×M array of transform coefficients and a matrix of a M×Q array, and a P×Q array of prediction residuals for the first block is derived by performing multiplication of a matrix of a P×N array and the N×Q array of intermediate values, and wherein, in a case where a target block is a second block smaller than the first block,
(i) an array of transform coefficients for the second block is derived from an array of quantized transform coefficients for the second block by using a quantization matrix for the second block, wherein a size of the array of transform coefficients for the second block, a size of the array of quantized transform coefficients for the second block, and a size of the quantization matrix for the second block are the same as a size of the second block, and
(ii) an array of prediction residuals a size of which is the same as the size of the second block is derived by performing multiplication using at least the array of transform coefficients for the second block and a matrix a size of which is the same as the size of the second block.

* * * * *